(12) United States Patent
Schumacher

(10) Patent No.: US 12,334,835 B2
(45) Date of Patent: Jun. 17, 2025

(54) TRANSPORT CLIMATE CONTROL SYSTEM WITH A SELF-CONFIGURING MATRIX POWER CONVERTER

(71) Applicant: THERMO KING LLC, Minneapolis, MN (US)

(72) Inventor: Ryan Wayne Schumacher, Bloomington, MN (US)

(73) Assignee: THERMO KING LLC, Minneapolis, MN (US)

( * ) Notice: Subject to any disclaimer, the term of this patent is extended or adjusted under 35 U.S.C. 154(b) by 448 days.

(21) Appl. No.: 17/836,502

(22) Filed: Jun. 9, 2022

(65) Prior Publication Data

US 2022/0297501 A1 Sep. 22, 2022

Related U.S. Application Data

(63) Continuation of application No. 16/565,110, filed on Sep. 9, 2019, now Pat. No. 11,376,922.

(51) Int. Cl.
*H02M 3/335* (2006.01)
*H02M 3/158* (2006.01)
*H02M 7/797* (2006.01)

(52) U.S. Cl.
CPC ..... *H02M 3/33592* (2013.01); *H02M 3/1584* (2013.01); *H02M 3/33571* (2021.05);
(Continued)

(58) Field of Classification Search
CPC ......... H02M 3/33573; H02M 3/33571; H02M 3/1584; H02M 3/33584; H02M 3/33592; H02M 7/797
See application file for complete search history.

(56) References Cited

U.S. PATENT DOCUMENTS 3,875,483 A 4/1975 Farr
5,104,037 A 4/1992 Karg et al.
(Continued)

FOREIGN PATENT DOCUMENTS

CN 2456117 10/2001
CN 1885660 12/2006
(Continued)

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.
(Continued)

*Primary Examiner* — Jue Zhang
*Assistant Examiner* — Lakaisha Jackson
(74) *Attorney, Agent, or Firm* — HSML P.C.

(57) ABSTRACT

A transport climate control system is disclosed. The transport climate control system includes a self-configuring matrix power converter having a charging mode, an inverter circuit, a controller, a first DC energy storage and a second DC energy storage, and a compressor. The first DC energy storage and the second DC energy storage have different voltage levels. During the charging mode, the inverter circuit is configured to convert a first AC voltage from an energy source to a first DC voltage, the controller is configured to control the self-configuring matrix power converter to convert the first DC voltage to a first output DC voltage to charge the first DC energy storage, and/or to a second output DC voltage to charge the second DC energy storage.

20 Claims, 12 Drawing Sheets

(52) U.S. Cl.
CPC ... *H02M 3/33573* (2021.05); *H02M 3/33584* (2013.01); *H02M 7/797* (2013.01)

(56) References Cited

U.S. PATENT DOCUMENTS

| | | | |
|---|---|---|---|
| 5,231,849 | A | 8/1993 | Rosenblatt |
| 6,280,320 | B1 | 8/2001 | Paschke et al. |
| 6,487,869 | B1 | 12/2002 | Sulc et al. |
| 6,518,727 | B2 | 2/2003 | Oomura et al. |
| 6,560,980 | B2 | 5/2003 | Gustafson et al. |
| 6,600,237 | B1 | 7/2003 | Meissner |
| 6,631,080 | B2 | 10/2003 | Trimble et al. |
| 6,652,330 | B1 | 11/2003 | Wasilewski |
| 6,688,125 | B2 | 2/2004 | Okamoto et al. |
| 6,753,692 | B2 | 6/2004 | Toyomura et al. |
| 6,925,826 | B2 | 8/2005 | Hille et al. |
| 7,011,902 | B2 | 3/2006 | Pearson |
| 7,120,539 | B2 | 10/2006 | Krull et al. |
| 7,122,923 | B2 | 10/2006 | Lafontaine et al. |
| 7,151,326 | B2 | 12/2006 | Jordan |
| 7,176,658 | B2 | 2/2007 | Quazi et al. |
| 7,206,692 | B2 | 4/2007 | Beesley et al. |
| 7,327,123 | B2 | 2/2008 | Faberman et al. |
| 7,424,343 | B2 | 9/2008 | Kates |
| 7,449,798 | B2 | 11/2008 | Suzuki et al. |
| 7,532,960 | B2 | 5/2009 | Kumar |
| 7,728,546 | B2 | 6/2010 | Tanaka et al. |
| 7,730,981 | B2 | 6/2010 | McCabe et al. |
| 7,745,953 | B2 | 6/2010 | Puccetti et al. |
| 7,806,796 | B2 | 10/2010 | Zhu |
| 7,830,117 | B2 | 11/2010 | Ambrosio et al. |
| 7,898,111 | B1 | 3/2011 | Pistel |
| 7,900,462 | B2 | 3/2011 | Hegar et al. |
| 8,020,651 | B2 | 9/2011 | Zillmer et al. |
| 8,030,880 | B2 | 10/2011 | Alston et al. |
| 8,134,339 | B2 | 3/2012 | Burlak et al. |
| 8,170,886 | B2 | 5/2012 | Luff |
| 8,214,141 | B2 | 7/2012 | Froeberg |
| 8,295,950 | B1 | 10/2012 | Wordsworth et al. |
| 8,381,540 | B2 | 2/2013 | Alston |
| 8,441,228 | B2 | 5/2013 | Brabec |
| 8,476,872 | B2 | 7/2013 | Truckenbrod et al. |
| 8,487,458 | B2 | 7/2013 | Steele et al. |
| 8,541,905 | B2 | 9/2013 | Brabec |
| 8,602,141 | B2 | 12/2013 | Yee et al. |
| 8,626,367 | B2 | 1/2014 | Krueger et al. |
| 8,626,419 | B2 | 1/2014 | Mitchell et al. |
| 8,643,216 | B2 | 2/2014 | Lattin |
| 8,643,217 | B2 | 2/2014 | Gietzold et al. |
| 8,670,225 | B2 | 3/2014 | Nunes |
| 8,723,344 | B1 | 5/2014 | Dierickx |
| 8,742,620 | B1 | 6/2014 | Brennan et al. |
| 8,760,115 | B2 | 6/2014 | Kinser et al. |
| 8,764,469 | B2 | 7/2014 | Lamb |
| 8,767,379 | B2 | 7/2014 | Whitaker |
| 8,818,588 | B2 | 8/2014 | Ambrosio et al. |
| 8,862,356 | B2 | 10/2014 | Miller |
| 8,912,683 | B2 | 12/2014 | Dames et al. |
| 8,924,057 | B2 | 12/2014 | Kinser et al. |
| 8,978,798 | B2 | 5/2015 | Dalum et al. |
| 9,030,336 | B2 | 5/2015 | Doyle |
| 9,061,680 | B2 | 6/2015 | Dalum |
| 9,093,788 | B2 | 7/2015 | Lamb |
| 9,102,241 | B2 | 8/2015 | Brabec |
| 9,147,335 | B2 | 9/2015 | Raghunathan et al. |
| 9,199,543 | B2 | 12/2015 | Brabec |
| 9,313,616 | B2 | 4/2016 | Mitchell et al. |
| 9,436,853 | B1 | 9/2016 | Meyers |
| 9,440,507 | B2 | 9/2016 | Giovanardi et al. |
| 9,463,681 | B2 | 10/2016 | Olaleye et al. |
| 9,464,839 | B2 | 10/2016 | Rusignuolo et al. |
| 9,557,100 | B2 | 1/2017 | Chopko et al. |
| 9,562,715 | B2 | 2/2017 | Kandasamy |
| 9,694,697 | B2 | 7/2017 | Brabec |
| 9,738,160 | B2 | 8/2017 | Bae et al. |
| 9,758,013 | B2 | 9/2017 | Steele |
| 9,783,024 | B2 | 10/2017 | Connell et al. |
| 9,784,780 | B2 | 10/2017 | Loftus et al. |
| 9,825,549 | B2 | 11/2017 | Choi et al. |
| 9,846,086 | B1 | 12/2017 | Robinson et al. |
| 9,893,545 | B2 | 2/2018 | Bean |
| 9,931,960 | B2 | 4/2018 | Tabatowski-Bush et al. |
| 9,975,403 | B2 | 5/2018 | Rusignuolo et al. |
| 9,975,446 | B2 | 5/2018 | Weber et al. |
| 9,987,906 | B2 | 6/2018 | Kennedy |
| 10,000,122 | B2 | 6/2018 | Wu et al. |
| 10,148,212 | B2 | 12/2018 | Schumacher et al. |
| 10,240,847 | B1 | 3/2019 | Thomas, Jr. |
| 2002/0113576 | A1 | 8/2002 | Oomura et al. |
| 2003/0043607 | A1 | 3/2003 | Vinciarelli et al. |
| 2003/0106332 | A1 | 6/2003 | Okamoto et al. |
| 2003/0200017 | A1 | 10/2003 | Capps et al. |
| 2003/0201097 | A1 | 10/2003 | Zeigler et al. |
| 2005/0057210 | A1 | 3/2005 | Jeda et al. |
| 2005/0065684 | A1 | 3/2005 | Larson et al. |
| 2006/0284601 | A1 | 12/2006 | Salasoo et al. |
| 2007/0052241 | A1 | 3/2007 | Pacy |
| 2007/0192116 | A1 | 8/2007 | Levitt |
| 2008/0084714 | A1* | 4/2008 | Kawasaki ......... H02M 3/33576 363/21.01 |
| 2008/0087479 | A1 | 4/2008 | Kang |
| 2008/0177678 | A1 | 7/2008 | Di Martini et al. |
| 2008/0281473 | A1 | 11/2008 | Pitt |
| 2009/0121798 | A1 | 5/2009 | Levinson |
| 2009/0122901 | A1 | 5/2009 | Choi et al. |
| 2009/0126901 | A1 | 5/2009 | Hegar et al. |
| 2009/0178424 | A1 | 7/2009 | Hwang et al. |
| 2009/0195349 | A1 | 8/2009 | Frader-Thompson et al. |
| 2009/0228155 | A1 | 9/2009 | Slifkin et al. |
| 2009/0314019 | A1 | 12/2009 | Fujimoto et al. |
| 2009/0320515 | A1 | 12/2009 | Bischofberger et al. |
| 2010/0045105 | A1 | 2/2010 | Bovio et al. |
| 2010/0050671 | A1 | 3/2010 | Kahn et al. |
| 2010/0230224 | A1 | 9/2010 | Hindman |
| 2010/0312425 | A1 | 12/2010 | Obayashi et al. |
| 2010/0320018 | A1 | 12/2010 | Gwozdek et al. |
| 2011/0000244 | A1 | 1/2011 | Reason et al. |
| 2011/0114398 | A1 | 5/2011 | Bianco |
| 2011/0118916 | A1 | 5/2011 | Gullichsen |
| 2011/0162395 | A1 | 7/2011 | Chakiachvili et al. |
| 2011/0208378 | A1 | 8/2011 | Krueger et al. |
| 2011/0224841 | A1 | 9/2011 | Profitt-Brown et al. |
| 2011/0241420 | A1 | 10/2011 | Hering et al. |
| 2011/0290893 | A1 | 12/2011 | Steinberg |
| 2012/0000212 | A1 | 1/2012 | Sanders et al. |
| 2012/0116931 | A1 | 5/2012 | Meyers |
| 2012/0153722 | A1 | 6/2012 | Nazarian |
| 2012/0198866 | A1 | 8/2012 | Zeidner |
| 2012/0310376 | A1 | 12/2012 | Krumm et al. |
| 2012/0310416 | A1 | 12/2012 | Tepper et al. |
| 2013/0000342 | A1 | 1/2013 | Blasko et al. |
| 2013/0073094 | A1 | 3/2013 | Knapton et al. |
| 2013/0088900 | A1 | 4/2013 | Park |
| 2013/0158828 | A1 | 6/2013 | McAlister |
| 2013/0201726 | A1* | 8/2013 | Hu .................. H02M 3/335 716/115 |
| 2013/0231808 | A1 | 9/2013 | Flath et al. |
| 2014/0001858 | A1* | 1/2014 | Kwasinski ............... H02M 3/01 307/52 |
| 2014/0018969 | A1 | 1/2014 | Forbes, Jr. |
| 2014/0020414 | A1 | 1/2014 | Rusignuolo et al. |
| 2014/0026599 | A1 | 1/2014 | Rusignuolo et al. |
| 2014/0060097 | A1 | 3/2014 | Perreault |
| 2014/0137590 | A1 | 5/2014 | Chopko et al. |
| 2014/0230470 | A1 | 8/2014 | Cook |
| 2014/0265560 | A1 | 9/2014 | Leehey et al. |
| 2015/0019132 | A1 | 1/2015 | Gusikhin et al. |
| 2015/0081212 | A1 | 3/2015 | Mitchell et al. |
| 2015/0121923 | A1 | 5/2015 | Rusignuolo et al. |
| 2015/0168032 | A1 | 6/2015 | Steele |
| 2015/0188360 | A1 | 7/2015 | Doane et al. |
| 2015/0246593 | A1 | 9/2015 | Larson et al. |
| 2015/0306937 | A1 | 10/2015 | Kitamura et al. |
| 2015/0316301 | A1 | 11/2015 | Kolda et al. |

(56) References Cited

U.S. PATENT DOCUMENTS

| | | |
|---|---|---|
| 2015/0345958 A1 | 12/2015 | Graham |
| 2015/0355288 A1 | 12/2015 | Yokoyama et al. |
| 2015/0360568 A1 | 12/2015 | Champagne et al. |
| 2016/0011001 A1 | 1/2016 | Emory et al. |
| 2016/0035152 A1 | 2/2016 | Kargupta |
| 2016/0089994 A1 | 3/2016 | Keller et al. |
| 2016/0144764 A1 | 5/2016 | Dutta et al. |
| 2016/0252289 A1 | 9/2016 | Feng et al. |
| 2016/0280040 A1 | 9/2016 | Connell et al. |
| 2016/0285416 A1 | 9/2016 | Tiwari et al. |
| 2016/0291622 A1 | 10/2016 | Al-Mohssen et al. |
| 2016/0327921 A1 | 11/2016 | Ribbich et al. |
| 2016/0377309 A1 | 12/2016 | Abiprojo et al. |
| 2017/0030728 A1 | 2/2017 | Baglino et al. |
| 2017/0057323 A1 | 3/2017 | Neu et al. |
| 2017/0063248 A1 | 3/2017 | Lee et al. |
| 2017/0098954 A1 | 4/2017 | Ferguson et al. |
| 2017/0217280 A1 | 8/2017 | Larson et al. |
| 2017/0237355 A1 | 8/2017 | Stieneker et al. |
| 2017/0259764 A1 | 9/2017 | Da Silva Carvalho et al. |
| 2017/0302200 A1 | 10/2017 | Marcinkiewicz |
| 2017/0349078 A1 | 12/2017 | Dziuba et al. |
| 2018/0022187 A1 | 1/2018 | Connell et al. |
| 2018/0029436 A1 | 2/2018 | Zaeri et al. |
| 2018/0029488 A1 | 2/2018 | Sjödin |
| 2018/0087813 A1 | 3/2018 | Senf, Jr. |
| 2018/0111441 A1 | 4/2018 | Menard et al. |
| 2018/0154723 A1 | 6/2018 | Anderson et al. |
| 2018/0201092 A1 | 7/2018 | Ahuja et al. |
| 2018/0203443 A1 | 7/2018 | Newman |
| 2018/0222278 A1 | 8/2018 | Mizuma |
| 2018/0306533 A1 | 10/2018 | Alahyari et al. |
| 2018/0334012 A1 | 11/2018 | Geller et al. |
| 2018/0342876 A1 | 11/2018 | Agnew et al. |
| 2018/0342877 A1 | 11/2018 | Yoo et al. |
| 2018/0356870 A1 | 12/2018 | Rusignuolo |
| 2019/0047496 A1 | 2/2019 | Sufrin-Disler et al. |
| 2019/0086138 A1 | 3/2019 | Chopko et al. |
| 2019/0092122 A1 | 3/2019 | Vanous et al. |
| 2019/0123544 A1 | 4/2019 | Pelegris et al. |
| 2019/0184838 A1 | 6/2019 | Lee et al. |
| 2019/0255914 A1 | 8/2019 | Ikeda et al. |
| 2019/0283541 A1 | 9/2019 | Adetola et al. |
| 2019/0308487 A1 | 10/2019 | Badger, II et al. |
| 2020/0050753 A1 | 2/2020 | Davis et al. |
| 2020/0076029 A1 | 3/2020 | Litz |
| 2020/0086744 A1 | 3/2020 | Schumacher et al. |
| 2020/0101820 A1 | 4/2020 | Wenger et al. |
| 2020/0130471 A1 | 4/2020 | Leasure |
| 2020/0130473 A1 | 4/2020 | Schumacher et al. |
| 2020/0136504 A1 | 4/2020 | Schumacher et al. |
| 2020/0207184 A1 | 7/2020 | Schumacher et al. |
| 2020/0233410 A1 | 7/2020 | Burns et al. |
| 2020/0381916 A1 | 12/2020 | Oiwa |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 2942216 | 11/2015 |
| EP | 3343728 | 7/2018 |
| EP | 536552 | 9/2019 |
| EP | 3540340 | 9/2019 |
| GB | 2551999 | 1/2018 |
| JP | 2000158930 | 6/2000 |
| JP | 2007320352 | 12/2007 |
| JP | 2009243780 | 10/2009 |
| JP | 2019145521 | 8/2019 |
| KR | 10-2012-0092834 | 8/2012 |
| WO | 03038988 | 5/2003 |
| WO | 2008/153518 | 12/2008 |
| WO | 2009/155941 | 12/2009 |
| WO | 2010065476 | 6/2010 |
| WO | 2011066468 | 6/2011 |
| WO | 2012/138500 | 10/2012 |
| WO | 2012138497 | 10/2012 |
| WO | 2013/075623 | 5/2013 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106068 | 7/2014 |
| WO | 2016/038838 | 3/2016 |
| WO | 2016145107 | 9/2016 |
| WO | 2017058660 | 4/2017 |
| WO | 2017/083333 | 5/2017 |
| WO | 2017/083336 | 5/2017 |
| WO | 2017/151698 | 9/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018/017450 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

"Lamberet Smart Reefer on Solutrans", Zoeken, Jul. 28, 2015, 7 pages, available at: https://iepieleaks.nl/lamberet-smart-reefer-solutrans/.

U.S. Appl. No. 16/178,067, titled "Methods and Systems for Generation and Utilization of Supplemental Stored Energy for Use in Transport Climate Control", filed Nov. 1, 2018, 35 pages.

(56) References Cited

OTHER PUBLICATIONS

U.S. Appl. No. 16/565,063, titled "System and Method for Managing Power and Efficiently Sourcing a Variable Voltage for a Transport Climate Control System ", filed Sep. 9, 2019, 59 pages.
U.S. Appl. No. 16/574,754, titled "Methods and Systems for Energy Management of a Transport Climate Control System", filed Sep. 18, 2019, 50 pages.
U.S. Appl. No. 16/574,775, titled "Methods and Systems for Power and Load Management of a Transport Climate Control System", filed Sep. 18, 2019, 68 pages.
European Patent Application No. 18382672.6, titled "Methods and Systems for Energy Management of a Transport Climate Control System", filed Sep. 19, 2018, 50 pages.
European Patent Application No. 18382673.4 titled "Methods and Systems for Power and Load Management of a Transport Climate Control System", filed Sep. 19, 2018, 68 pages.
U.S. Appl. No. 16/176,802, titled "Methods and Systems for Controlling a Mild Hybrid System That Powers a Transport Climate Control System", filed Oct. 31, 2018, 31 pages.
U.S. Appl. No. 16/236,938, titled "Systems and Methods for Smart Load Shedding of a Transport Vehicle While in Transit", filed Dec. 31, 2018, 39 pages.
U.S. Appl. No. 16/176,720, titled "Methods and Systems for Augmenting a Vehicle Powered Transport Climate Control System", filed Oct. 31, 2018, 41 pages.
U.S. Appl. No. 16/176,602, titled "Reconfigurable Utility Power Input With Passive Voltage Booster", filed Oct. 31, 2018, 39 pages.
U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.
U.S. Appl. No. 16/235,865, titled "Methods and Systems for Preserving Autonomous Operation of a Transport Climate Control System", filed Dec. 28, 2018, 41 pages.
PCT International Application No. PCT/US2018/068136, titled "Methods and Systems for Providing Predictive Energy Consumption Feedback for Powering a Transport Climate Control System", filed Dec. 31, 2018, 34 pages.
PCT International Application No. PCT/US2018/068129, titled "Methods and Systems for Notifying and Mitigating a Suboptimal Event Occurring in a Transport Climate Control System", filed Dec. 31, 2018, 44 pages.
PCT International Application No. PCT/US2018/068139, titled "Methods and Systems for Providing Feedback for a Transport Climate Control System", filed Dec. 31, 2018, 37 pages.
PCT International Application No. PCT/US2018/068142, titled "Methods and Systems for Providing Predictive Energy Consumption Feedback for Powering a Transport Climate Control System Using External Data", filed Dec. 31, 2018, 39 pages.
U.S. Appl. No. 16/911,692, titled "Climate Controlled Vehicle, Transport Climate Control Equipment, Method of Retrofitting a Vehicle and Method of Operation", filed Jun. 25, 2020, 39 pages.
U.S. Appl. No. 16/565,205, titled "Transport Climate Control System With an Accessory Power Distribution Unit for Managing Transport Climate Control Loads", filed Sep. 9, 2019, 57 pages.
U.S. Appl. No. 16/565,146, titled "Optimized Power Management for a Transport Climate Control Energy Source", filed Sep. 9, 2019, 53 pages.
U.S. Appl. No. 62/897,833, titled "Optimized Power Distribution To Transport Climate Control Systems Amongst One or More Electric Supply Equipment Stations ", filed Sep. 9, 2019, 41 pages.
European Patent Application No. 19382776.3, titled "Mprioritized Power Delivery for Facilitating Transport Climate Control", filed Sep. 9, 2019, 41 pages.
U.S. Appl. No. 16/565,282, titled "Optimized Power Cord for Transferring Power to a Transport Climate Control System", filed Sep. 9, 2019, 43 pages.
U.S. Appl. No. 16/565,235, titled "Interface System for Connecting a Vehicle and a Transport Climate Control System", filed Sep. 9, 2019, 64 pages.
U.S. Appl. No. 16/565,252, titled "Demand-Side Power Distribution Management for a Plurality of Transport Climate Control Systems", filed Sep. 9, 2019, 44 pages.
U.S. Appl. No. 17/015,190, titled "Optimized Power Distribution to Transport Climate Control Systems Amongst One or More Electric Supply Equipment Stations", filed Sep. 9, 2020, 43 pages.
U.S. Appl. No. 16/147,708, titled "Methods and Systems for Autonomous Climate Control Optimization of a Transport Vehicle", filed Sep. 29, 2018, 41 pages.
U.S. Appl. No. 16/176,667, titled "Drive Off Protection System and Method for Preventing Drive Off", filed Oct. 31, 2018, 41 pages.
U.S. Appl. No. 16/730,126, titled "Transport Climate Control System Power Architecture", filed Dec. 30, 2019, 27 pages.
U.S. Appl. No. 17/015,194, titled "Prioritized Power Delivery for Facilitating Transport Climate Control", filed Sep. 9, 2020, 41 pages.
Extended European Search Report, issued in the corresponding European patent application No. 20195218.1, dated Jan. 22, 2021, 11 pages.

\* cited by examiner

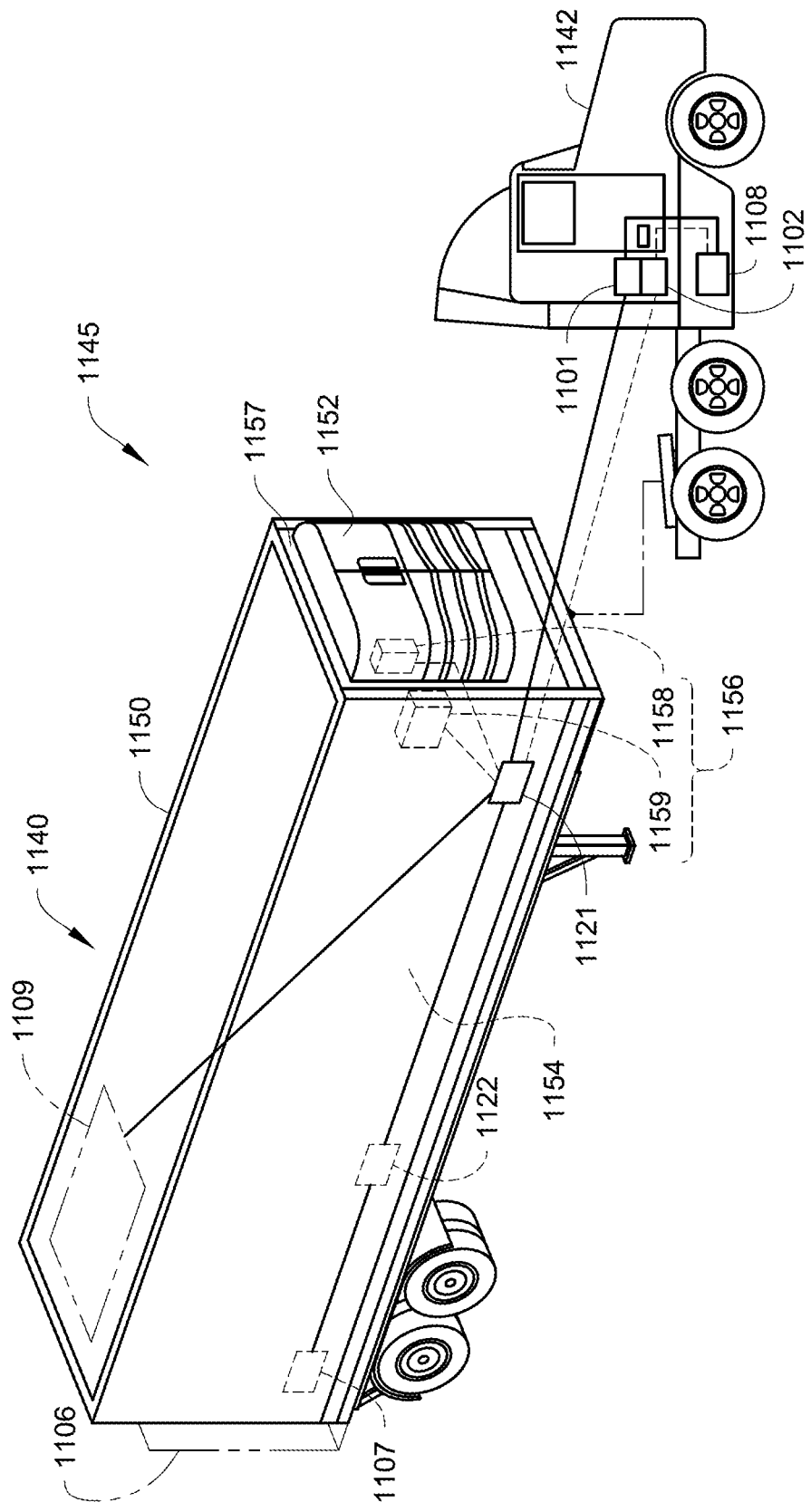

TRANSPORT CLIMATE CONTROL SYSTEM WITH A SELF-CONFIGURING MATRIX POWER CONVERTER

FIELD

This disclosure relates generally to energy conversion management in an electrically powered accessory configured to be used with at least one of a vehicle, trailer, and a transport container. More specifically, the disclosure relates to methods and systems for managing and controlling a self-configuring matrix power converter in a power circuit of an electrically powered accessory.

BACKGROUND

A transport climate control system is generally used to control environmental condition(s) (e.g., temperature, humidity, air quality, and the like) within a climate controlled space of a transport unit (e.g., a truck, a container (such as a container on a flat car, an intermodal container, etc.), a box car, a semi-tractor, a bus, or other similar transport unit). The transport climate control system can include, for example, a transport refrigeration system (TRS) and/or a heating, ventilation and air conditioning (HVAC) system. The TRS can control environmental condition(s) within the climate controlled space to maintain cargo (e.g., produce, frozen foods, pharmaceuticals, etc.). The HVAC system can control environmental conditions(s) within the climate controlled space to provide passenger comfort for passengers travelling in the transport unit. In some transport units, the transport climate control system can be installed externally (e.g., on a rooftop of the transport unit, on a front wall of the transport unit, etc.).

SUMMARY

This disclosure relates generally to energy conversion management in an electrically powered accessory configured to be used with at least one of a vehicle, trailer, and a transport container. More specifically, the disclosure relates to methods and systems for managing and controlling a self-configuring matrix power converter in a power circuit of an electrically powered accessory.

As the transport climate control systems enter electrification, a same transport climate control system may have to work with two or more different DC input voltages. In one embodiment, there can be separate components designed to work with the different input voltages. For example, there can be a design for a converter for a 24 VDC system, and a different converter for a 48 VDC system. Users may have to stock different parts for the different converters and may need different service parts. Such design may not be optimum for e.g., low volume product(s).

Embodiments disclosed herein can use a single power converter (e.g., a self-configuring matrix power converter) that can be self-configured to work with different voltages (e.g., 24 VDC or 48 VDC). Circuitry and magnetic portions of the single power converter not used can be minimized. Embodiments disclosed herein can accommodate different stages smoothly with reduced cost. The stages or magnetic windings of the single converter can change to support and optimize for the different input voltages.

In one embodiment, a transport climate control system power circuit is disclosed. The transport climate control system power circuit includes a self-configuring matrix power converter having a charging mode, an inverter circuit, a controller, a first DC energy storage and a second DC energy storage, and a compressor. The first DC energy storage and the second DC energy storage have different voltage levels. During the charging mode, the inverter circuit is configured to convert a first AC voltage from an energy source to a first DC voltage. The controller is configured to control the self-configuring matrix power converter to convert the first DC voltage to a first output DC voltage to charge the first DC energy storage, and/or to a second output DC voltage to charge the second DC energy storage.

In one embodiment, a transport climate control system power circuit is disclosed. The transport climate control system power circuit includes a self-configuring matrix power converter having an operation mode, an inverter circuit, a controller, a first DC energy storage and a second DC energy storage, and a compressor. The first DC energy storage and the second DC energy storage have different voltage levels. During the operation mode, the controller is configured to control the self-configuring matrix power converter to convert a first input DC voltage from the first DC energy storage and/or a second input DC voltage from the second DC energy storage to a second DC voltage. The inverter circuit is configured to convert the second DC voltage to an AC voltage to drive the compressor.

In one embodiment, a self-configuring matrix power converter for a transport climate control system is disclosed. The self-configuring matrix power converter includes a first converter circuit, a transformer circuit connecting to the first converter circuit, a second converter circuit connecting to the transformer circuit, and at least one switch having a first state and a second state. The self-configuring matrix power converter has an operation mode. During the operation mode, the least one switch is controlled to be in the first state to convert a first input DC voltage to a second DC voltage, and to be in the second state to convert a second input DC voltage to the second DC voltage.

In one embodiment, the self-configuring matrix power converter has a charging mode. During the charging mode, the least one switch is controlled to be in the first state to convert a first DC voltage to a first output DC voltage, and to be in the second state to convert the first DC voltage to a second output DC voltage. The first output DC voltage is different from the second output DC voltage.

In one embodiment, an electrically powered accessory is disclosed. The electrically powered accessory includes a self-configuring matrix power converter having a charging mode, an inverter circuit, a controller, a first DC energy storage and a second DC energy storage, and a compressor. The first DC energy storage and the second DC energy storage have different voltage levels. During the charging mode, the inverter circuit is configured to convert a first AC voltage from an energy source to a first DC voltage. The controller is configured to control the self-configuring matrix power converter to convert the first DC voltage to a first output DC voltage to charge the first DC energy storage, and/or to a second output DC voltage to charge the second DC energy storage.

In one embodiment, an electrically powered accessory is disclosed. The electrically powered accessory includes a self-configuring matrix power converter having an operation mode, an inverter circuit, a controller, a first DC energy storage and a second DC energy storage, and a compressor. The first DC energy storage and the second DC energy storage have different voltage levels. During the operation mode, the controller is configured to control the self-configuring matrix power converter to convert a first input DC voltage from the first DC energy storage and/or a second input DC voltage from the second DC energy storage to a second DC voltage. The inverter circuit is configured to convert the second DC voltage to an AC voltage to drive the compressor.

In one embodiment, a self-configuring matrix power converter for an electrically powered accessory is disclosed. The self-configuring matrix power converter includes a first converter circuit, a transformer circuit connecting to the first converter circuit, a second converter circuit connecting to the transformer circuit, and at least one switch having a first state and a second state. The self-configuring matrix power converter has an operation mode. During the operation mode, the least one switch is controlled to be in the first state to convert a first input DC voltage to a second DC voltage, and to be in the second state to convert a second input DC voltage to the second DC voltage.

In one embodiment, the self-configuring matrix power converter has a charging mode. During the charging mode, the least one switch is controlled to be in the first state to convert a first DC voltage to a first output DC voltage, and to be in the second state to convert the first DC voltage to a second output DC voltage. The first output DC voltage is different from the second output DC voltage.

Embodiment disclosed herein can configure the self-configuring matrix power converter to optimize for different voltage levels of the system. Embodiment disclosed herein can also reuse existing power converters and/or transformers to reduce cost by, e.g., reconfiguring the componentry in the self-configuring matrix power converter for different voltage levels.

Embodiments disclosed herein can facilitate ease of service (e.g., a single reconfigurable power converter is used instead of multiple different power converter), improve reliability (e.g., less power converters can lead to lower Defective Parts per Million and/or less misconfigurations); increase customer satisfaction (e.g., with reduced confusion and/or reduced risk of improper application and failure), and reduce cost (e.g., by reusing some high cost components such as power converters, switching devices, gate driver circuitry, master controllers, DC link, transformers or magnetics, filtering circuits, A/D circuitry, and/or core software, etc.).

BRIEF DESCRIPTION OF THE DRAWINGS

References are made to the accompanying drawings that form a part of this disclosure and which illustrate embodiments in which the systems and methods described in this specification can be practiced.

FIG. 1C illustrates a perspective view of a climate controlled transport unit, with a transport climate control system, attached to a tractor, according to one embodiment.

Like reference numbers represent like parts throughout.

DETAILED DESCRIPTIONS

Figure 1A:
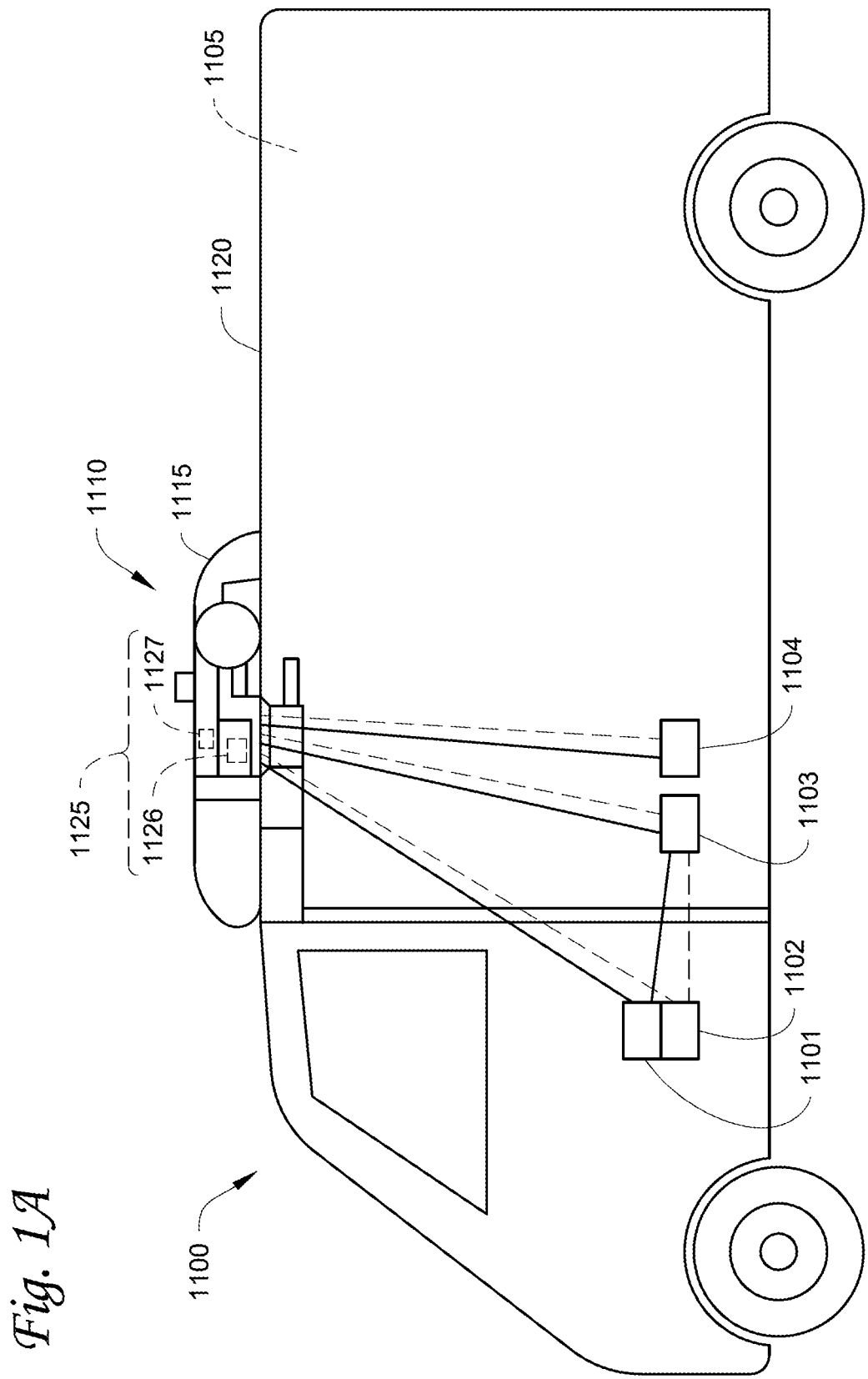
FIG. 1A illustrates a side view of a van with a transport climate control system, according to one embodiment.

This disclosure relates generally to energy conversion management in an electrically powered accessory configured to be used with at least one of a vehicle, trailer, and a transport container. More specifically, the disclosure relates to methods and systems for managing and controlling a self-configuring matrix power converter in a power circuit for an electrically powered accessory.

As transport climate control systems enter electrification, more than one power/energy source can be used, and the amount of dissimilar power sources (e.g., different energy storage sources, utility power sources, renewable power sources, on-board power generation, etc.) is increasing. As such, multiple different DC to DC converters and/or inverters/rectifiers can be used to provide interface between different system power converters for different power sources. E.g., for a power source at one voltage level, there can be a corresponding power converter to convert the voltage level to the voltage requirements of other power converters in the system. Thus, many different power converters can be added into the system to accommodate different voltage levels to interface with different components. This design can lead to issues causing failure to meet the performance, delivery, cost, and/or reliability goals, or can cause confusion or errors when maintaining or servicing the system.

Embodiments disclosed herein can make the power converter (e.g., a self-configuring matrix power converter) reconfigurable and utilize much of the circuitry in each configuration, to accommodate different voltage level transformations. The transformation ratio (magnetics) in the power converter can be set at a predetermined value at manufacturing. Switches in the power converter can be controlled to reconfigure the number of windings of the transformer(s) to be used, in one direction or bi-direction.

For example, in one embodiment, instead of using a separate utility (shore) power converter to interface from AC power supply to the DC network, a compressor drive module (CDM) can be reused to rectify and convert voltage level(s). Additional circuitry or modification in the CDM may be needed. Compared with using a separate converter (e.g., utility power converter) and/or wiring and/or connectors, such design can reduce cost and reduce complexity.

In one embodiment, the self-configuring matrix power converter can work in a charging mode and/or a compressor operation mode. In the charging mode, the AC power from the power source can be converted to charge an auxiliary or vehicle energy source storage. In the compressor operation mode, the DC voltage from the vehicle supply or auxiliary energy storage can be translated to a DC link to run a compressor motor drive inverter. The vehicle supply or auxiliary energy storage can have dissimilar voltage levels and the self-configuring matrix power converter can reconfigure to accommodate the different voltage levels and optimize the system accordingly. It will be appreciated that in one embodiment, the compressor operation mode can be the primary mode. In another embodiment, the charging mode can be the primary mode. It will also be appreciated that embodiments disclosed herein provide a DC/DC converter that takes either a first (e.g., 12 VDC) input or a second (e.g., 24 VDC) and creates a DC link (400 VDC) that is the same voltage not dependent on input voltage supplied.

It is noted that: U.S. application Ser. No. 16/565,063, "SYSTEM AND METHOD FOR MANAGING POWER AND EFFICIENTLY SOURCING A VARIABLE VOLTAGE FOR A TRANSPORT CLIMATE CONTROL SYSTEM,"; U.S. application Ser. No. 16/565,146, "OPTIMIZED POWER MANAGEMENT FOR A TRANSPORT CLIMATE CONTROL ENERGY SOURCE,"; U.S. Provisional Application No. 62/897,833, "OPTIMIZED POWER DISTRIBUTION TO TRANSPORT CLIMATE CONTROL SYSTEMS AMONGST ONE OR MORE ELECTRIC SUPPLY EQUIPMENT STATIONS,"; European Patent Application Number 19382776.3, "PRIORITIZED POWER DELIVERY FOR FACILITATING TRANSPORT CLIMATE CONTROL,"; U.S. application Ser. No. 17/644,492, "TRANSPORT CLIMATE CONTROL SYSTEM WITH AN ACCESSORY POWER DISTRIBUTION UNIT FOR MANAGING TRANSPORT CLIMATE CONTROL ELECTRICALLY POWERED ACCESSORY LOADS,"; U.S. application Ser. No. 16/565,235, "AN INTERFACE SYSTEM FOR CONNECTING A VEHICLE AND A TRANSPORT CLIMATE CONTROL SYSTEM,"; U.S. application Ser. No. 16/565,252, "DEMAND-SIDE POWER DISTRIBUTION MANAGEMENT FOR A PLURALITY OF TRANSPORT CLIMATE CONTROL SYSTEMS,"; and U.S. application Ser. No. 16/565,282, "OPTIMIZED POWER CORD FOR TRANSFERRING POWER TO A TRANSPORT CLIMATE CONTROL SYSTEM,"; all filed concurrently herewith on Sep. 9, 2019, and the contents of which are incorporated herein by reference.

While the embodiments described below illustrate different embodiments of a transport climate control system, it will be appreciated that the electrically powered accessory is not limited to the transport climate control system or a climate control unit (CCU) of the transport climate control system. It will be appreciated that a CCU can be e.g., a transport refrigeration unit (TRU). In other embodiments, the electrically powered accessory can be, for example, a crane attached to a vehicle, a cement mixer attached to a truck, one or more food appliances of a food truck, a boom arm attached to a vehicle, a concrete pumping truck, a refuse truck, a fire truck (with a power driven ladder, pumps, lights, etc.), etc. It will be appreciated that the electrically powered accessory may require continuous operation even when the vehicle's ignition is turned off and/or the vehicle is parked and/or idling and/or charging. The electrically powered accessory can require substantial power to operate and/or continuous and/or autonomous operation (e.g., controlling temperature/humidity/airflow of a climate controlled space) on an as needed basis, independent of the vehicle's operational mode.

FIG. 1A depicts a climate-controlled van 1100 that includes a climate controlled space 1105 for carrying cargo and a transport climate control system 1110 for providing climate control within the climate controlled space 1105. The transport climate control system 1110 includes a climate control unit (CCU) 1115 that is mounted to a rooftop 1120 of the van 1100. The transport climate control system 1110 can include, amongst other components, a climate control circuit (not shown) that connects, for example, a compressor, a condenser, an evaporator and an expansion device to provide climate control within the climate controlled space 1105. It will be appreciated that the embodiments described herein are not limited to climate-controlled vans, but can apply to any type of transport unit (e.g., a truck, a container (such as a container on a flat car, an intermodal container, a marine container, etc.), a box car, a semi-tractor, a bus, or other similar transport unit), etc.

The transport climate control system 1110 also includes a programmable climate controller 1125 and one or more sensors (not shown) that are configured to measure one or more parameters of the transport climate control system 1110 (e.g., an ambient temperature outside of the van 1100, an ambient humidity outside of the van 1100, a compressor suction pressure, a compressor discharge pressure, a supply air temperature of air supplied by the CCU 1115 into the climate controlled space 1105, a return air temperature of air returned from the climate controlled space 1105 back to the CCU 1115, a humidity within the climate controlled space 1105, etc.) and communicate parameter data to the climate controller 1125. The climate controller 1125 is configured to control operation of the transport climate control system 1110 including the components of the climate control circuit. The climate controller unit 1115 may comprise a single integrated control unit 1126 or may comprise a distributed network of climate controller elements 1126, 1127. The number of distributed control elements in a given network can depend upon the particular application of the principles described herein.

The climate-controlled van 1100 can also include a vehicle power distribute unit (PDU) 1101, a vehicle electrical system (VES) 1102, a standard charging port 1103, and/or an enhanced charging port 1104. The VES 1102 can include a controller (not shown). The vehicle PDU 1101 can include a controller (not shown). In one embodiment, the vehicle PDU controller can be a part of the VES controller or vice versa. In one embodiment, power can be distributed from e.g., an Electric Vehicle Supply Equipment (EVSE, not shown), via the standard charging port 1103, to the vehicle PDU 1101. Power can also be distributed from the vehicle PDU 1101 to an electrical supply equipment (ESE, not shown) and/or to the CCU 1115 (see solid lines for power lines and dotted lines for communication lines). In another embodiment, power can be distributed from e.g., an EVSE (not shown), via the enhanced charging port 1104, to an ESE (not shown) and/or to the CCU 1115. The ESE can then distribute power to the vehicle PDU 1101 via the standard charging port 1103.

Figure 1B:
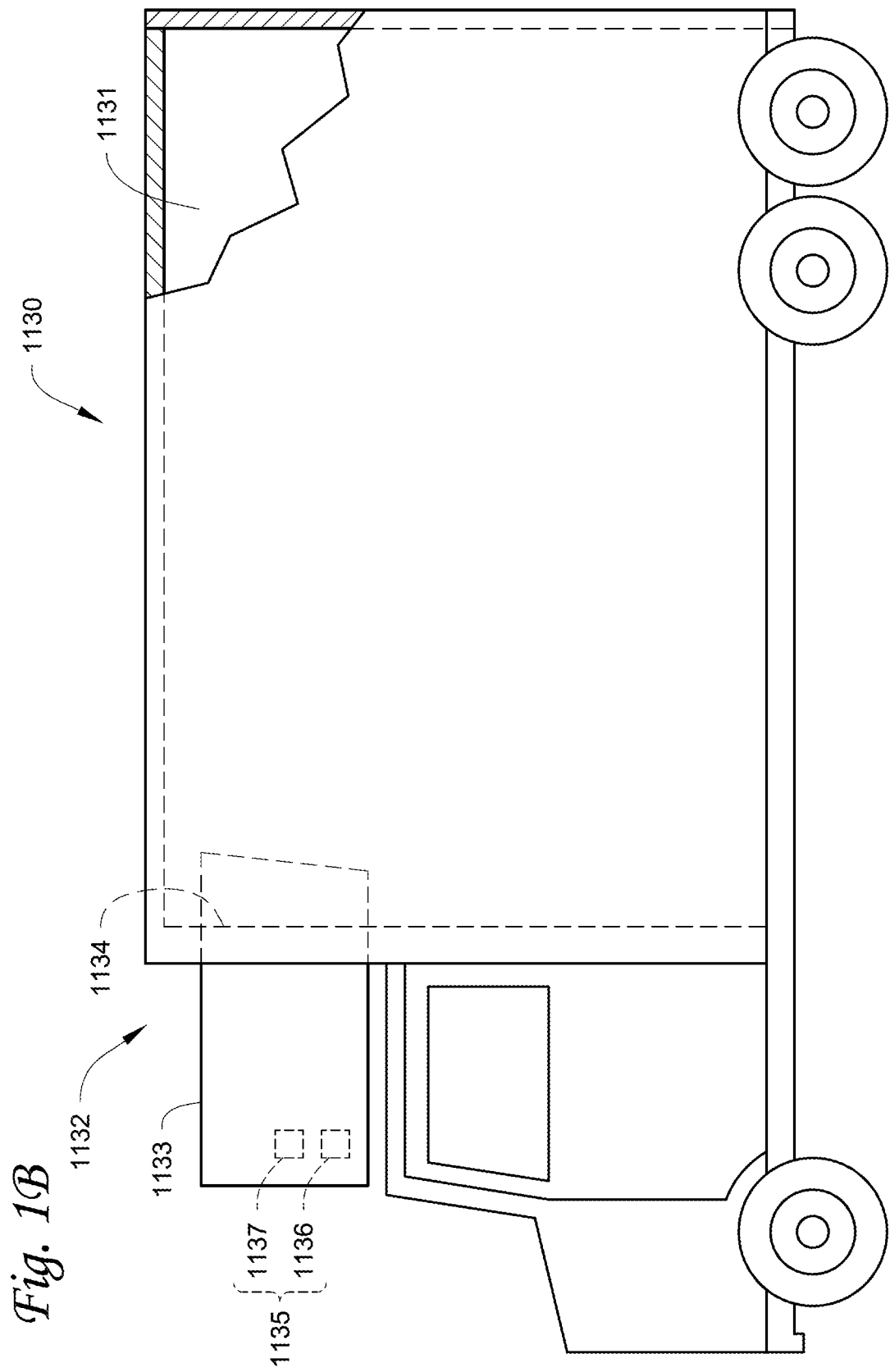
FIG. 1B illustrates a side view of a truck with a transport climate control system, according to one embodiment.

FIG. 1B depicts a climate-controlled straight truck 1130 that includes a climate controlled space 1131 for carrying cargo and a transport climate control system 1132. The transport climate control system 1132 includes a CCU 1133 that is mounted to a front wall 1134 of the climate controlled space 1131. The CCU 1133 can include, amongst other components, a climate control circuit (not shown) that connects, for example, a compressor, a condenser, an evaporator and an expansion device to provide climate control within the climate controlled space 1131.

The transport climate control system 1132 also includes a programmable climate controller 1135 and one or more sensors (not shown) that are configured to measure one or more parameters of the transport climate control system 1132 (e.g., an ambient temperature outside of the truck 1130, an ambient humidity outside of the truck 1130, a compressor suction pressure, a compressor discharge pressure, a supply air temperature of air supplied by the CCU 1133 into the climate controlled space 1131, a return air temperature of air returned from the climate controlled space 1131 back to the CCU 1133, a humidity within the climate controlled space 1131, etc.) and communicate parameter data to the climate controller 1135. The climate controller 1135 is configured to control operation of the transport climate control system 1132 including components of the climate control circuit. The climate controller 1135 may comprise a single integrated control unit 1136 or may comprise a distributed network of climate controller elements 1136, 1137. The number of distributed control elements in a given network can depend upon the particular application of the principles described herein.

It will be appreciated that similar to the climate-controlled van 1100 shown in FIG. 1A, the climate-controlled straight truck 1130 of FIG. 1B can also include a vehicle PDU (such as the vehicle PDU 1101 shown in FIG. 1A), a VES (such as the VES 1102 shown in FIG. 1A), a standard charging port (such as the standard charging port 1103 shown in FIG. 1A), and/or an enhanced charging port (e.g., the enhanced charging port 1104 shown in FIG. 1A), communicating with and distribute power from/to the corresponding ESE and/or the CCU 1133.

FIG. 1C illustrates one embodiment of a climate controlled transport unit 1140 attached to a tractor 1142. The climate controlled transport unit 1140 includes a transport climate control system 1145 for a transport unit 1150. The tractor 1142 is attached to and is configured to tow the transport unit 1150. The transport unit 1150 shown in FIG. 1C is a trailer.

The transport climate control system 1145 includes a CCU 1152 that provides environmental control (e.g. temperature, humidity, air quality, etc.) within a climate controlled space 1154 of the transport unit 1150. The CCU 1152 is disposed on a front wall 1157 of the transport unit 1150. In other embodiments, it will be appreciated that the CCU 1152 can be disposed, for example, on a rooftop or another wall of the transport unit 1150. The CCU 1152 includes a climate control circuit (not shown) that connects, for example, a compressor, a condenser, an evaporator and an expansion device to provide conditioned air within the climate controlled space 1154.

The transport climate control system 1145 also includes a programmable climate controller 1156 and one or more sensors (not shown) that are configured to measure one or more parameters of the transport climate control system 1145 (e.g., an ambient temperature outside of the transport unit 1150, an ambient humidity outside of the transport unit 1150, a compressor suction pressure, a compressor discharge pressure, a supply air temperature of air supplied by the CCU 1152 into the climate controlled space 1154, a return air temperature of air returned from the climate controlled space 1154 back to the CCU 1152, a humidity within the climate controlled space 1154, etc.) and communicate parameter data to the climate controller 1156. The climate controller 1156 is configured to control operation of the transport climate control system 1145 including components of the climate control circuit. The climate controller 1156 may comprise a single integrated control unit 1158 or may comprise a distributed network of climate controller elements 1158, 1159. The number of distributed control elements in a given network can depend upon the particular application of the principles described herein.

The tractor 1142 can include an APU 1108. The APU 1108 can be an electric auxiliary power unit (eAPU). The tractor 1142 can also include a vehicle PDU 1101 and a VES 1102 (see FIG. 1A). The APU 1108 can provide power to the vehicle PDU 1101 for distribution. It will be appreciated that for the connections, solid lines represent power lines and dotted lines represent communication lines. The climate controlled transport unit 1140 can include a PDU 1121 connecting to power sources (including solar power source 1109; power source 1122 such as Genset, fuel cell, undermount power unit, auxiliary battery pack, etc.; and/or liftgate battery 1107) of the climate controlled transport unit 1140. The PDU 1121 can include a controller (not shown). The PDU controller can be a part of the climate controller 1156. The PDU 1121 can distribute power from the power sources of the climate controlled transport unit 1140 to e.g., the transport climate control system 1145. The climate controlled transport unit 1140 can also include a liftgate 1106. The liftgate battery 1107 can provide power to open and/or close the liftgate 1106.

It will be appreciated that similar to the climate-controlled van 1100, the climate controlled transport unit 1140 attached to the tractor 1142 of FIG. 1C can also include a VES (such as the VES 1102 shown in FIG. 1A), a standard charging port (such as the standard charging port 1103 shown in FIG. 1A), and/or an enhanced charging port (such as the enhanced charging port 1104 shown in FIG. 1A), communicating with and distribute power from/to a corresponding ESE and/or the CCU 1152. It will be appreciated that the charging port(s) 1103 and/or can be on either the tractor 1142 or the trailer. For example, in one embodiment, the standard charging port 1103 is on the tractor 1142 and the enhanced charging port 1104 is on the trailer.

Figure 1D:
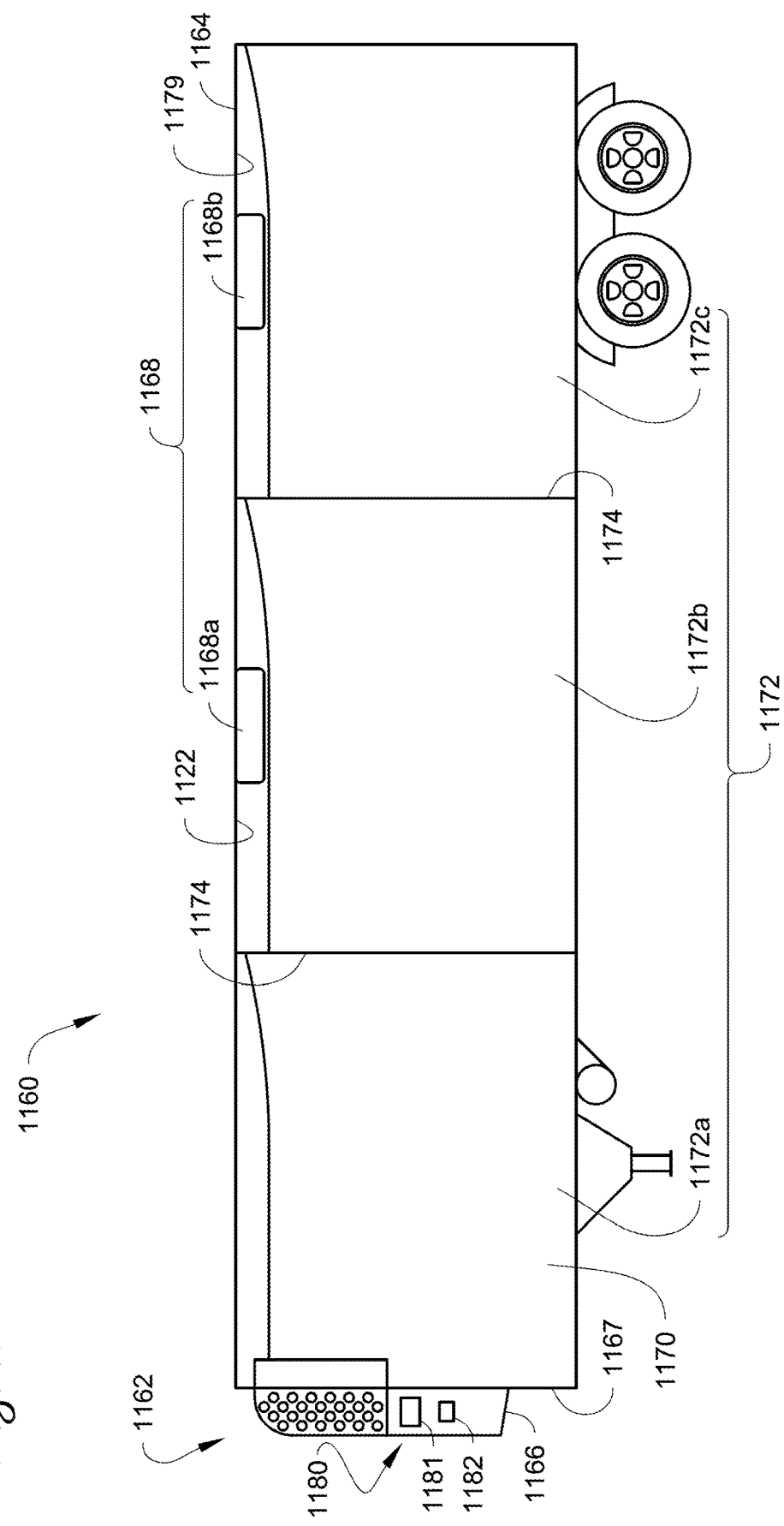
FIG. 1D illustrates a side view of a climate controlled transport unit with a multi-zone transport climate control system, according to one embodiment.

FIG. 1D illustrates another embodiment of a climate controlled transport unit 1160. The climate controlled transport unit 1160 includes a multi-zone transport climate control system (MTCS) 1162 for a transport unit 1164 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The MTCS 1162 includes a CCU 1166 and a plurality of remote units 1168 that provide environmental control (e.g. temperature, humidity, air quality, etc.) within a climate controlled space 1170 of the transport unit 1164. The climate controlled space 1170 can be divided into a plurality of zones 1172. The term "zone" means a part of an area of the climate controlled space 1170 separated by walls 1174. The CCU 1166 can operate as a host unit and provide climate control within a first zone 1172a of the climate controlled space 1166. The remote unit 1168a can provide climate control within a second zone 1172b of the climate controlled space 1170. The remote unit 1168b can provide climate control within a third zone 1172c of the climate controlled space 1170. Accordingly, the MTCS 1162 can be used to separately and independently control environmental condition(s) within each of the multiple zones 1172 of the climate controlled space 1162.

The CCU 1166 is disposed on a front wall 1167 of the transport unit 1160. In other embodiments, it will be appreciated that the CCU 1166 can be disposed, for example, on a rooftop or another wall of the transport unit 1160. The CCU 1166 includes a climate control circuit (not shown) that connects, for example, a compressor, a condenser, an evaporator and an expansion device to provide conditioned air within the climate controlled space 1170. The remote unit 1168*a* is disposed on a ceiling 1179 within the second zone 1172*b* and the remote unit 1168*b* is disposed on the ceiling 1179 within the third zone 1172*c*. Each of the remote units 1168*a,b* include an evaporator (not shown) that connects to the rest of the climate control circuit provided in the CCU 1166.

The MTCS 1162 also includes a programmable climate controller 1180 and one or more sensors (not shown) that are configured to measure one or more parameters of the MTCS 1162 (e.g., an ambient temperature outside of the transport unit 1164, an ambient humidity outside of the transport unit 1164, a compressor suction pressure, a compressor discharge pressure, supply air temperatures of air supplied by the CCU 1166 and the remote units 1168 into each of the zones 1172, return air temperatures of air returned from each of the zones 1172 back to the respective CCU 1166 or remote unit 1168*a* or 1168*b*, a humidity within each of the zones 1118, etc.) and communicate parameter data to a climate controller 1180. The climate controller 1180 is configured to control operation of the MTCS 1162 including components of the climate control circuit. The climate controller 1180 may comprise a single integrated control unit 1181 or may comprise a distributed network of climate controller elements 1181, 1182. The number of distributed control elements in a given network can depend upon the particular application of the principles described herein.

It will be appreciated that similar to the climate-controlled van 1100, the climate controlled transport unit 1160 of FIG. 1D can also include a vehicle PDU (such as the vehicle PDU 1101 shown in FIG. 1A), a VES (such as the VES 1102 shown in FIG. 1A), a standard charging port (such as the standard charging port 1103 shown in FIG. 1A), and/or an enhanced charging port (e.g., the enhanced charging port 1104 shown in FIG. 1A), communicating with and distribute power from/to the corresponding ESE and/or the CCU 1166.

Figure 1E:
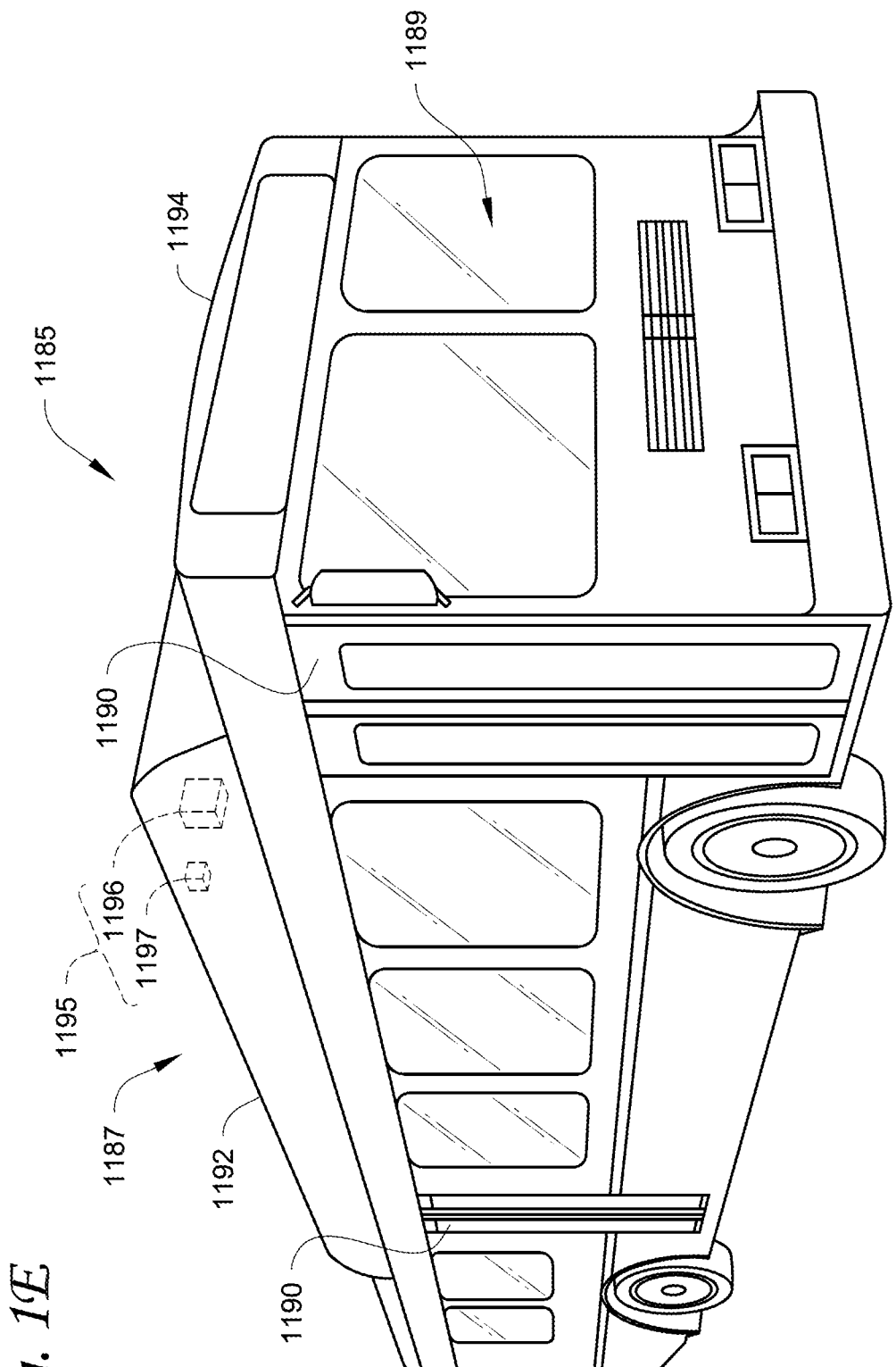
FIG. 1E illustrates a perspective view of a mass-transit vehicle including a transport climate control system, according to one embodiment.

FIG. 1E is a perspective view of a vehicle 1185 including a transport climate control system 1187, according to one embodiment. The vehicle 1185 is a mass-transit bus that can carry passenger(s) (not shown) to one or more destinations. In other embodiments, the vehicle 1185 can be a school bus, railway vehicle, subway car, or other commercial vehicle that carries passengers. The vehicle 1185 includes a climate controlled space (e.g., passenger compartment) 1189 supported that can accommodate a plurality of passengers. The vehicle 1185 includes doors 1190 that are positioned on a side of the vehicle 1185. In the embodiment shown in FIG. 1E, a first door 1190 is located adjacent to a forward end of the vehicle 1185, and a second door 1190 is positioned towards a rearward end of the vehicle 1185. Each door 1190 is movable between an open position and a closed position to selectively allow access to the climate controlled space 1189. The transport climate control system 1187 includes a CCU 1192 attached to a roof 1194 of the vehicle 1185.

The CCU 1192 includes a climate control circuit (not shown) that connects, for example, a compressor, a condenser, an evaporator and an expansion device to provide conditioned air within the climate controlled space 1189. The transport climate control system 1187 also includes a programmable climate controller 1195 and one or more sensors (not shown) that are configured to measure one or more parameters of the transport climate control system 1187 (e.g., an ambient temperature outside of the vehicle 1185, a space temperature within the climate controlled space 1189, an ambient humidity outside of the vehicle 1185, a space humidity within the climate controlled space 1189, etc.) and communicate parameter data to the climate controller 1195. The climate controller 1195 is configured to control operation of the transport climate control system 1187 including components of the climate control circuit. The climate controller 1195 may comprise a single integrated control unit 1196 or may comprise a distributed network of climate controller elements 1196, 1197. The number of distributed control elements in a given network can depend upon the particular application of the principles described herein.

It will be appreciated that similar to the climate-controlled van 1100, the vehicle 1185 including a transport climate control system 1187 of FIG. 1E can also include a vehicle PDU (such as the vehicle PDU 1101 shown in FIG. 1A), a VES (such as the VES 1102 shown in FIG. 1A), a standard charging port (such as the standard charging port 1103 shown in FIG. 1A), and/or an enhanced charging port (e.g., the enhanced charging port 1104 shown in FIG. 1A), communicating with and distribute power from/to the corresponding ESE and/or the CCU 1192.

Figure 2:
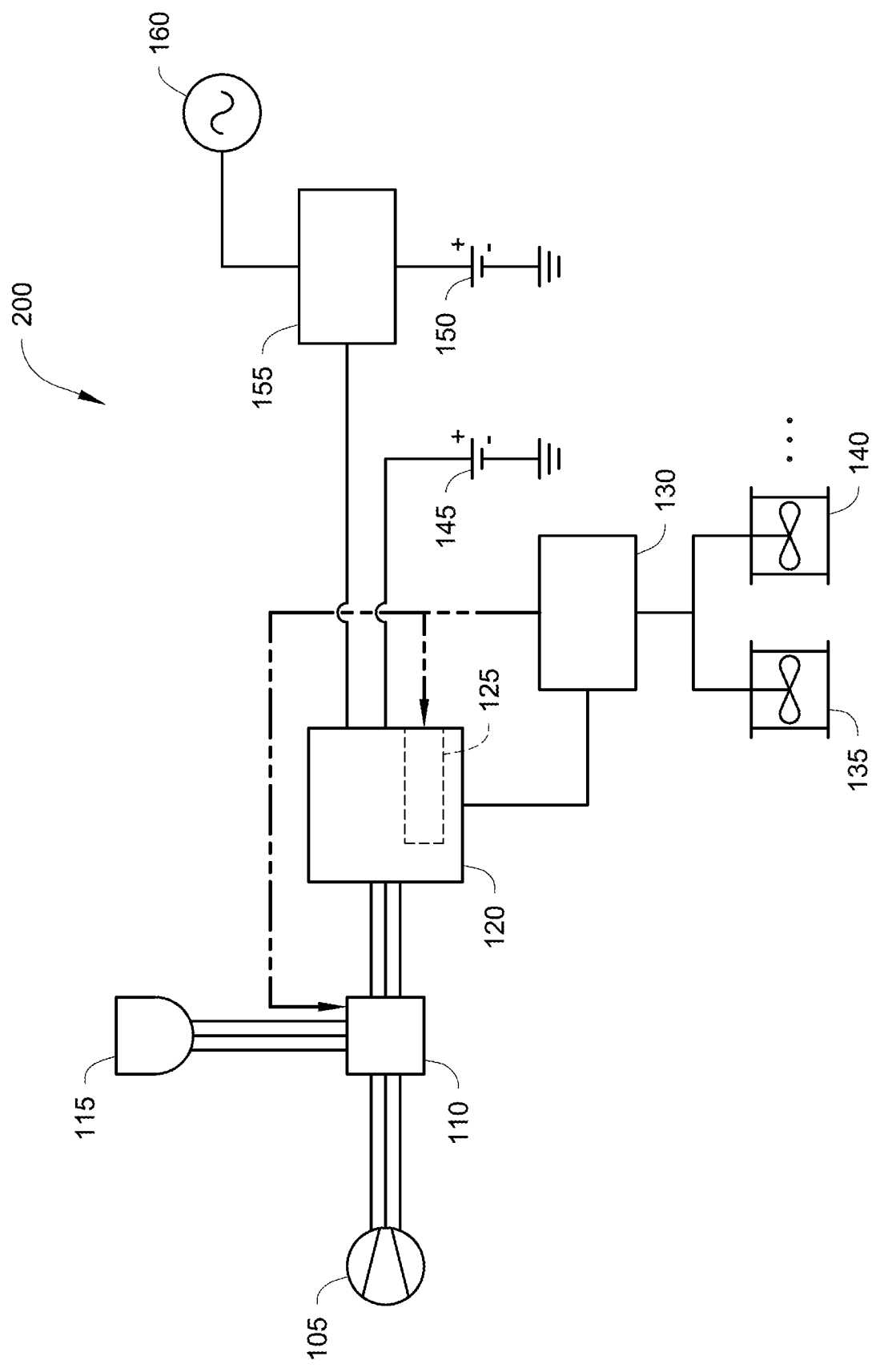
FIG. 2 is a schematic illustration of a transport climate control system, according to one embodiment.

FIG. 2 is a schematic illustration of a transport climate control system power circuit 200, according to one embodiment. The transport climate control system power circuit 200 can be used to power, for example, the transport climate control systems 1110, 1132, 1145, 1162 and 1187 shown in FIGS. 1A-E.

The transport climate control system power circuit 200 includes a compressor 105. The compressor 105 can compress a heat transfer fluid (e.g., refrigerant or the like) from a relatively lower pressure gas to a relatively higher-pressure and higher temperature gas. The relatively higher-pressure and higher temperature gas can be discharged from the compressor 105.

The transport climate control system power circuit 200 also includes a vehicle energy storage 150 and a unit auxiliary energy storage 145. It will be appreciated that in some embodiments, the power circuit 200 may include only one of the vehicle energy storage 150 and the auxiliary energy storage 145. The transport climate control system power circuit 200 further includes a plurality of loads 135, 140. It will be appreciated that in some embodiments, the power circuit 200 may include only a single load 135. The plurality of loads 135, 140 can be, e.g., local loads (e.g., host loads of a host unit), remote loads (of a host unit), etc. It will be appreciated that host unit can refer to e.g., the master HVAC unit in a multi-temperature system. The other chambers of the multi-temperature system can be "remotes" to the host unit. Host loads can include e.g., evaporator fan(s), condenser fan(s), liquid cooling pumps, solenoids, control/stepper valves, and/or shutter doors, etc. Remote loads can be the loads in a remote zone unit (relative to the host unit). Remote loads can include e.g., evaporator fan(s), condenser fan(s), liquid cooling pumps, solenoids, control/stepper valves, and/or shutter doors, etc. The plurality of loads 135, 140 can include, e.g., a DC load. The DC load can be a DC evaporator fan, a DC condenser fan, etc.

Also the transport climate control system power circuit 200 includes a power converter 120. The power converter 120 can include a controller 125.

The transport climate control system power circuit 200 also includes a unit controller 130 (e.g., for controlling a transport refrigeration unit). In some embodiments, the controller 125 can be part of the unit controller 130.

The transport climate control system power circuit 200 also includes a generator machine 160 (e.g., a belt-driven alternator, a direct drive generator, etc.). It will be appreciated that the generator 160 can be a high voltage generator. The generator 160 can be configured to charge the vehicle energy storage 150, via e.g., the vehicle power bus 155. Also the generator 160 can generate electrical power to drive the compressor 105, via the vehicle power bus 155 and the power converter 120.

It will be appreciated that the power generated from the generator 160 can also be used to drive the plurality of loads 135, 140, via the vehicle power bus 155 and the power converter 120. It will also be appreciated that the power generated from the generator 160 can be used to charge the unit auxiliary energy storage 145, via e.g., the vehicle power bus 155 and the power converter module.

As shown in FIG. 2, the transport climate control system power circuit 200 can connect to an energy source 115. The energy source 115 can be, e.g., a utility (shore) power source. The energy source 115 can be a single phase or a dual-phase or a three-phase AC energy source. The compressor 105 can be a single phase or a dual-phase or a three-phase compressor. The energy source 115 can be used to drive the compressor 105, via e.g., a switch network 110. The energy source 115 can also be used to charge the unit auxiliary energy storage 145 and/or the vehicle energy storage 150, via the switch network 110 and the power converter 120. The energy source 115 can further be used to drive the at least one load 135, 140, via the switch network 110 and the power converter 120. The energy source 115 can provide, e.g., 120 VAC, 240 VAC, 400 VAC, or other suitable AC voltage.

The unit controller 130 can be configured to control the switch network 110 to direct power from the energy source 115 to either the compressor 105 or the power converter 120. The unit controller 130 can also be configured to control switches (not shown) of the power converter 120, or to control the controller 125 to control switches of the power converter 120. The unit controller 130 can further be configured to control the at least one load 135, 140.

The unit auxiliary energy storage 145, the vehicle energy storage 150, and/or the power generated by the generator 160 can have low voltage or high voltage.

As defined herein, "low voltage" refers to Class A of the ISO 6469-3 in the automotive environment. In particular, "low voltage" refers to a maximum working voltage of between 0V and 60V DC or between 0V and 30V AC. E.g., a low voltage can be 12 VDC, 24 VDC, 48 VDC, or other suitable DC voltage.

As defined herein, "high voltage" refers to Class B of the ISO 6469-3 in the automotive environment. In particular, "high voltage" refers to a maximum working voltage of between 60V and 1500V DC or between 30V and 1000V AC. E.g., a high voltage can be 350 VDC, 400 VDC, 700 VDC, 800 VDC or other suitable DC voltage.

Figure 3A:
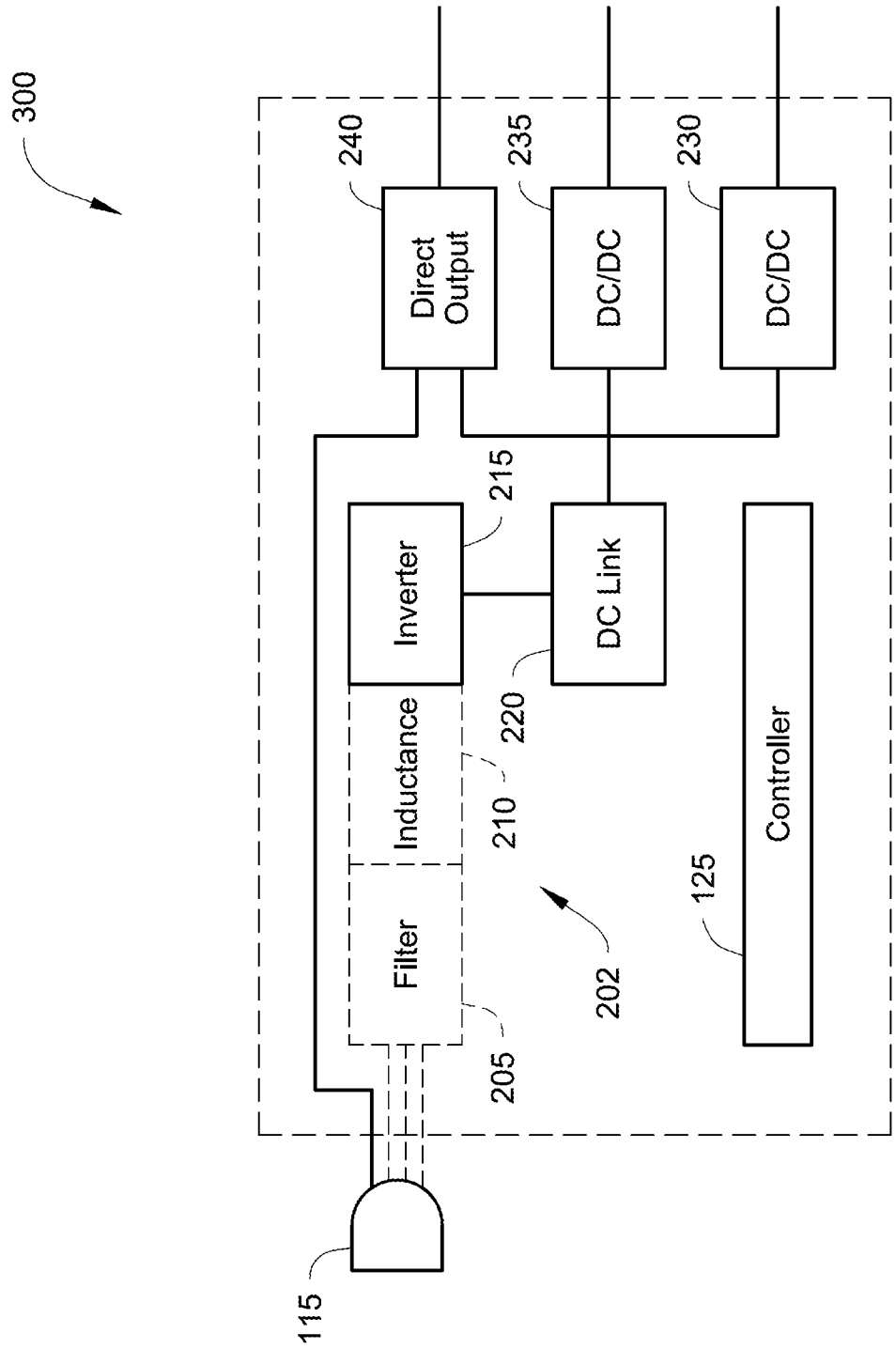
FIG. 3A is a schematic illustration of a charging system having a utility (shore) power source charging a transport climate control system via a power converter, according to one embodiment.

FIG. 3A is a schematic illustration of a charging system 300 having a utility power source 115 charging a transport climate control system via a power converter (e.g., the power converter 120 of FIG. 2), according to one embodiment.

The power converter includes an AC to DC converter 202. The AC to DC converter 202 can be connected to the utility power source 115. The AC to DC converter 202 can include an optional filter 205, an optional inductance 210, and an inverter 215. The optional filter 205 can be an electromagnetic interference (EMI) filter to suppress conducted interference present on the power line connected to the utility power source 115. The inductance 210 can be a boost inductance to boost the filtered AC voltage from the optional filter 205. The inverter 215 can convert the boosted AC voltage from the optional inductance 210 to a DC voltage, or convert the filtered AC voltage from the optional filter 205 to a DC voltage. The inverter 215 can be an active front end (AFE) inverter and/or a power factor correction (PFC) inverter. The converted DC voltage from the AC to DC converter 202 is inputted to a DC link 220 for power balancing. The output DC voltage from the DC link 220 can be fed (e.g., via a direct output line 240) into a vehicle network (e.g., Class B voltage). It will be appreciated that the utility power source 115 can directly provide power to a load (e.g., a vehicle network, an energy storage, etc.) via the direct output line 240. The output DC voltage from the DC link 220 can also be sent to a vehicle network (e.g., Class A voltage) via a DC to DC converter (a self-configuring matrix power converter) 235. The output DC voltage from the DC link 220 can further be sent to a unit auxiliary energy storage via a DC to DC converter (a self-configuring matrix power converter) 230. The controller 125 can be configured to control e.g., the switches (not shown) of the DC to DC converters 230 and 235 so that the utility power source 115 can charge different energy storages (different voltages) using a same self-configuring matrix power converter (230, 235). The power converter also includes the DC link 220, the direct output line 240, the self-configuring matrix power converter (230, 235), and the controller 125.

Figure 3B:
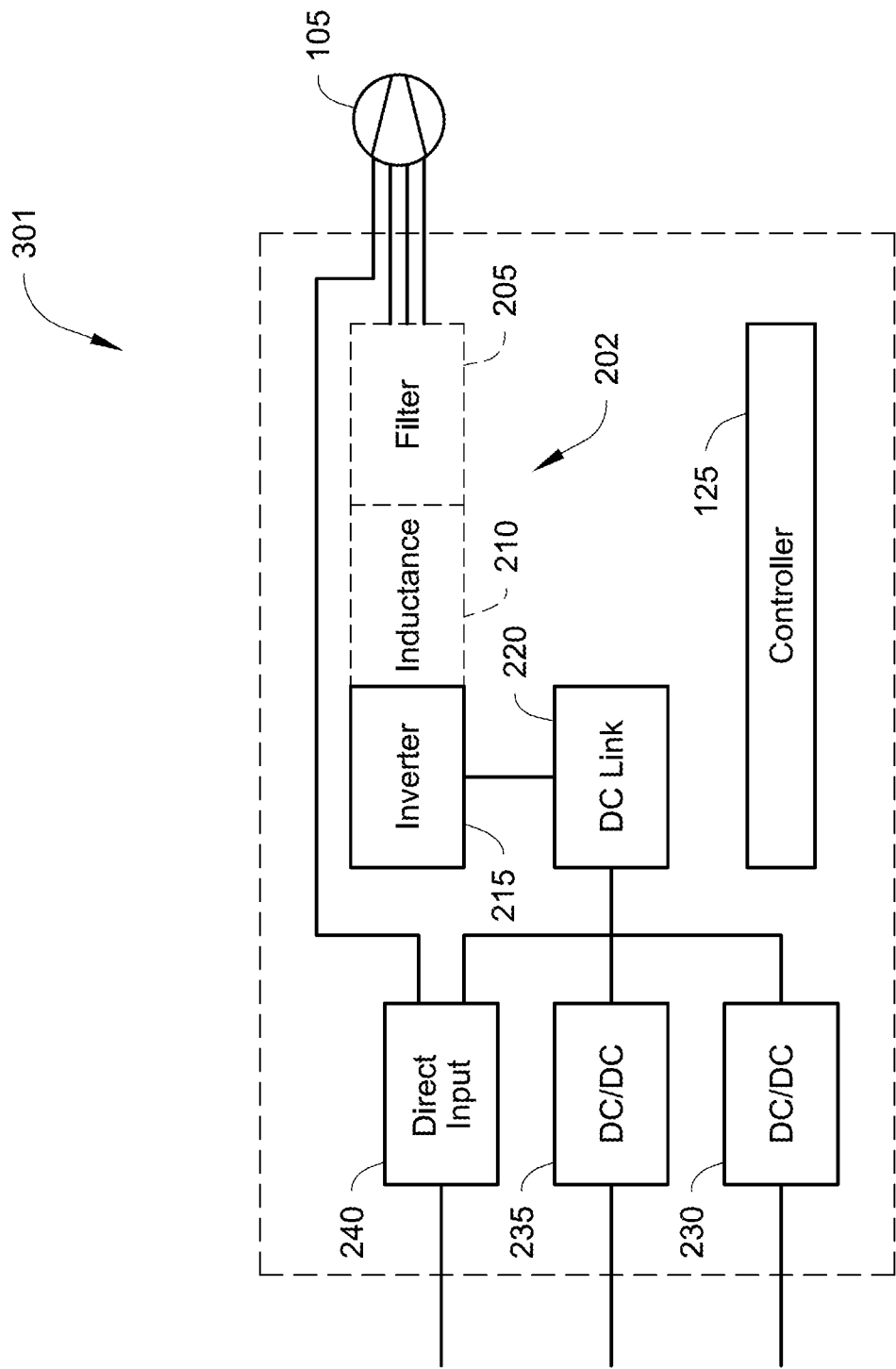
FIG. 3B is a schematic illustration of a compressor driving system driving a compressor of a transport climate control system via a power converter, according to one embodiment.

FIG. 3B is a schematic illustration of a compressor driving system 301 driving a compressor 105 of a transport climate control system via a power converter (e.g., the power converter 120 of FIG. 2), according to one embodiment.

The power converter also includes the DC link 220, the direct input line 240, the self-configuring matrix power converter (230, 235), the controller 125, and the DC to AC converter 202.

An output DC voltage from a vehicle network (e.g., Class B voltage) can be fed (e.g., via the direct input line 240) into a DC link 220. It will be appreciated that the output DC voltage from a vehicle network can directly provide power to the load (e.g., the compressor 105) via the direct input line 240. An output DC voltage from a vehicle network (e.g., Class A voltage) can also be sent to the DC link 220 via a DC to DC converter (the self-configuring matrix power converter) 235. An output DC voltage from an unit auxiliary energy storage can further be sent to the DC link 220 via a DC to DC converter (the self-configuring matrix power converter) 230. The controller 125 can be configured to control e.g., the switches (not shown) of the DC to DC converters 230 and 235 so that different energy storages (different voltages) can drive the compressor 105 using a same self-configuring matrix power converter (230, 235). The output DC voltage from the DC link 220 can be input to the DC to AC converter 202 for converting the input DC voltage to an AC voltage to drive the compressor 105. The DC to AC converter 202 includes the inverter 215. The inverter 215 can convert the input DC voltage from the DC link 220 to an AC voltage. The inverter 215 can be an active front end (AFE) inverter and/or a power factor correction (PFC) inverter. The DC to AC converter 202 can also include an optional inductance 210. The optional inductance 210 can be a boost inductance to boost the converted AC voltage from the inverter 215. The DC to AC converter 202 can further include an optional filter 205. The optional filter 205 can be an electromagnetic interference (EMI) filter to suppress conducted interference present on the power line connected to either the inverter 215 or the optional inductance 210. The output AC voltage from the optional filter 205 can be used to drive the compressor 105.

It will be appreciated that in FIGS. 3A and 3B, the DC to DC converters 230 and 235, the direct input/output line 240, the converter 202, and the DC link 220 can be bi-directional. For example, in a compressor driving direction, the converter 202 can be a DC to AC converter (e.g., a compressor drive module CDM). In a charging direction, the converter 202 can be an AC to DC converter (e.g., using the CDM to rectify). At least one sensor (e.g., voltage sensor, current sensor, temperature sensor, pressure sensor, speed sensor, etc.) can be configured to sense the parameters (e.g., voltage, current, temperature, pressure, speed, etc.) of the transport climate control system and send the sensed parameter data to the controller. The controller can be configured to control the components (e.g., configuring the direction of the components, controlling the switches, etc.) based on e.g., the sensed parameter data. It will also be appreciated that the self-configuring matrix power converter can be interleaved or non-interleaved converter.

Figure 4:
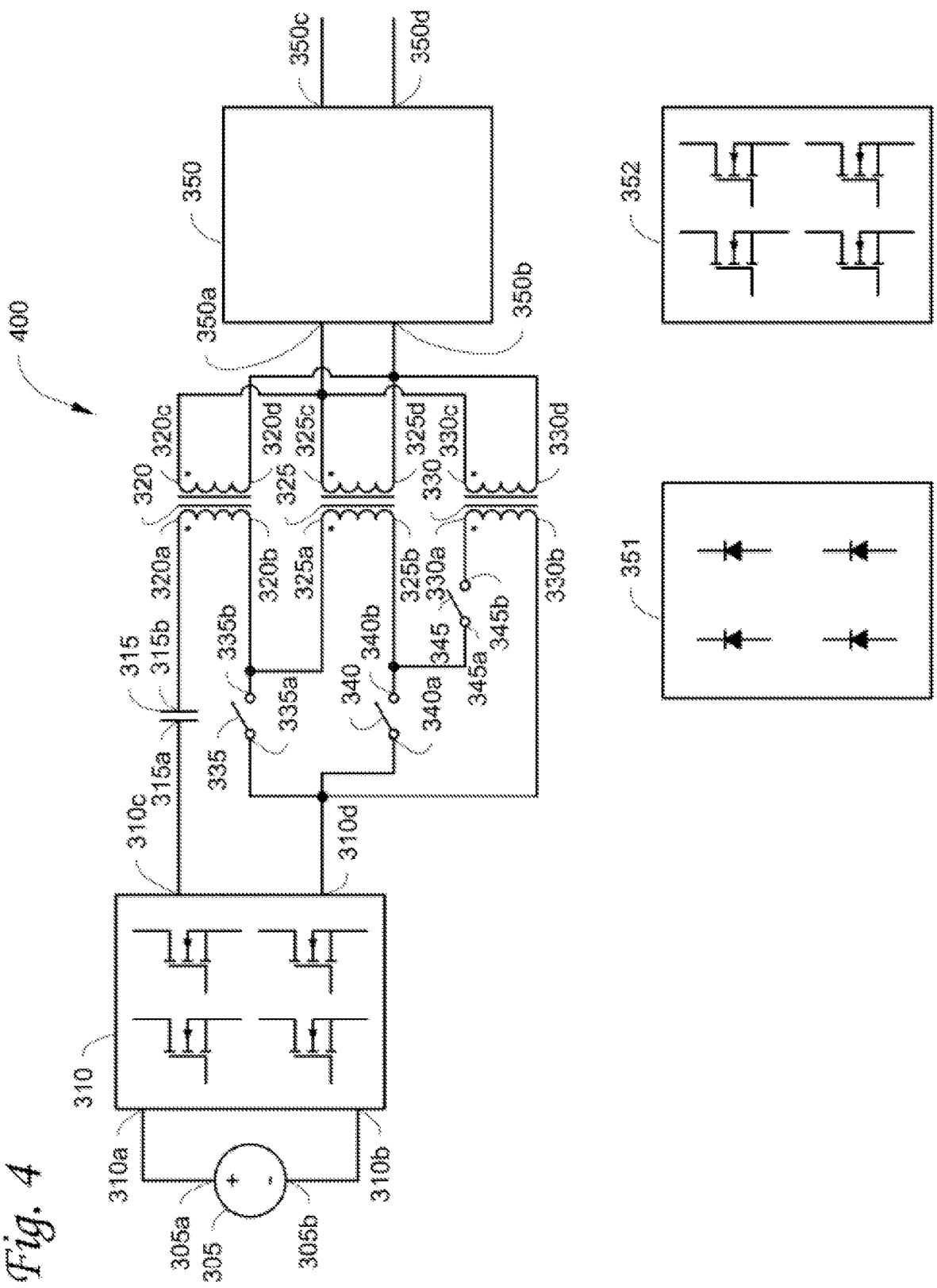
FIG. 4 is a circuit diagram of a self-configuring matrix power converter in a power circuit of a transport climate control system, according to one embodiment.

FIG. 4 is a circuit diagram of a self-configuring matrix power converter 400 in a power circuit of a transport climate control system, according to one embodiment.

The self-configuring matrix power converter 400 can be the self-configuring matrix power converter module 230, 235 of FIGS. 3A and 3B. The self-configuring matrix power converter 400 includes an inverter 310. The inverter 310 can be a DC to AC inverter (in a direction that drives e.g., the compressor) or an AC to DC inverter (e.g., in a direction that charges e.g., the DC power source or the DC energy storage). The inverter 310 can be a half-bridge inverter for half-wave design, or a full bridge inverter for full-wave design. The inverter 310 can connect to a DC power source 305. The DC power source 305 can be a Class A power source. For example, the DC power source 305 can be 12 VDC, 24 VDC, 48 VDC, or other suitable DC voltage.

The self-configuring matrix power converter 400 also includes switches 335, 340, 345; transformers 320, 325, 330; and a rectification circuit 350. The DC power from the DC power source 305 can be input (e.g., in a direction that drives e.g., the compressor) to the inverter 310 (e.g., a DC to AC inverter). The AC power from the inverter 310 (e.g., an AC to DC inverter) can be input (e.g., in a direction that charges e.g., the DC power source 305) to the DC power source 305. The self-configuring matrix power converter 400 can also include a capacitor 315. The capacitor 315 can be a DC blocking capacitor. In one embodiment, the capacitor 315 can be optional. One end of 315a the capacitor 315 can connect to an end 310c of the inverter 310. Another end 315b of the capacitor 315 can connect to an end 320a of the transformer 320. An end 320b of the transformer 320 connects to an end 335b of the switch 335 and an end 325a of the transformer 325. An end 325b of the transformer 325 connects to an end 340b of the switch 340 and an end 345a of the switch 345. Another end 345b of the switch 345 connects to an end 330a of the transformer 330. An end 330b of the transformer 330 connects to an end 310d of the inverter 310, an end 335a of the switch 335, and an end 340a of the switch 340. An end 320c of the transformer 320 connects to an end 325c of the transformer 325, an end 330c of the transformer 330, and an end 350a of the rectification circuit 350. An end 320d of the transformer 320 connects to an end 325d of the transformer 325, an end 330d of the transformer 330, and an end 350b of the rectification circuit 350. The ends 350c, 350d of the rectification circuit 350 can connect to e.g., a DC link (e.g., the DC link 220 of FIG. 3B) to e.g., drive a compressor via the CDM.

It will be appreciated that the transformers 320, 325, 330 can share a same core, or having respective cores. Each transformer 320, 325, 330 can convert AC from one voltage to another. In one embodiment, each transformer 320, 325, 330 can convert a first AC to a second AC (e.g., an HV AC). It will be appreciated that in some embodiments, to simplify the description, 12 VAC (or other voltages) can be defined as an AC voltage converted from a 12 VDC via an inverter; and/or 12 VDC (or other voltages) can be defined as a DC voltage converted from a 12 VAC via a converter. Each transformer 320, 325, 330 has a predetermined transformation ratio (magnetics). In some embodiments, each transformer 320, 325 has a same transformation ratio (e.g., that can convert a low voltage AC to a high voltage AC in e.g., the compressor driving mode/direction). The transformer 330 can have a transformation ratio that is twice of the transformation ratio of transformer 320 or 325. In another embodiment, the transformer 330 can have a transformation ratio that is half of or the same as the transformation ratio of transformer 320 or 325. It will be appreciated that transformers can provide galvanic or electrical isolation from output to input, which can aid in creating isolated or "floating" power supplies in the system.

The switches 335, 340, 345 can be a Metal-Oxide-Semiconductor Field-Effect Transistor (MOSFET), an Insulated Gate Bipolar Transistor (IGBT), or a Bipolar Junction Transistor (BJT), or the like. The rectification circuit 350 can be a passive rectification circuit 351, or an active rectification circuit 352. It will also be appreciated that when the rectification circuit 350 is the active rectification circuit 352, the self-configuring matrix power converter 400 can operate bi-directional (a compressor driving direction using the DC power source 305 to drive the compressor, and/or a charging direction to charge the DC power source 305 with e.g., a utility (shore) power source).

In operation, in the compressor driving mode/direction, a controller (e.g., the controller 125 of FIGS. 2, 3A, and 3B) can control the switches 335, 340, 345 based on the input voltage of the DC power source 305.

When/if the voltage of the DC power source 305 is a first DC voltage (e.g., 12 VDC), the controller can control the switch 335 on (connected/closed), and control the switches 340 and 345 off (disconnected/opened). As such, only transformer 320 will be used in the circuit. Transformers 325 and 330 are disconnected (not used). In such embodiment, a first DC voltage (e.g., 12 VDC) can be converted to a first AC voltage via the inverter 310, and then to a second AC voltage (e.g., an HV AC) via the transformer 320, and then to an HV DC voltage output (e.g., 400 VDC) via the rectification circuit 350.

When/if the voltage of the DC power source 305 is a second voltage (e.g., 24 VDC), the controller can control the switch 340 on (connected/closed), and control the switches 335 and 345 off (disconnected/opened). As such, only transformers 320 and 325 will be used in the circuit. Transformer 330 is disconnected (not used). In such embodiment, a second DC voltage (e.g., 24 VDC) can be converted to a first AC voltage via the inverter 310, and then to a second AC voltage (e.g., an HV AC) via the transformers 320 and 325, and then to an HV DC voltage output (e.g., 800 VDC) via the rectification circuit 350.

When/if the voltage of the DC power source 305 is a third DC voltage (e.g., 48 VDC), the controller can control the switch 345 on (connected/closed), and control the switches 335 and 340 off (disconnected/opened). As such, all transformers 320, 325, 330 will be used in the circuit. In such embodiment, a third DC voltage (e.g., 48 VDC) can be converted to a first AC voltage via the inverter 310, and then to a second AC voltage (e.g., an HV AC) via the transformers 320, 325, 330, and then to an HV DC voltage output (e.g., 1600 VDC) via the rectification circuit 350. In such embodiment, the transformation ratio of the transformer 330 can be twice of the transformation ratio of transformer 320 or 325. In another embodiment, when e.g., the transformation ratio of the transformer 330 is half of the transformation ratio of transformer 320 or 325, the output voltage from the rectification circuit 350 can be 1200 VDC.

It will be appreciated that in in the operation mode/direction, when/if the voltage of the DC power source 305 varies (e.g., can be any one of the first (e.g., 12 VDC), the second (24 VDC), or the third (48 VDC) DC voltage), the controller can control the switches 335, 340, 345 so that the output DC voltage from the self-configuring matrix power converter 400 can be the same (e.g., same 400 VDC, or same 800 VDC, or same 1200 VDC, or same 1600 VDC).

In operation, in the charging mode/direction, the controller can control the switches 335, 340, 345 based on the input voltage (from 350c and 350d) of the rectification circuit 350, to charge the DC power source 305. In such embodiment, the rectification circuit 350 is bi-directional. Similar to the operation in the compressor driving mode/direction (but in a reversed path), the controller can control the switches 335, 340, 345 similarly such that when charging a first DC voltage (e.g., 12 VDC power source 305), the input DC voltage (from 350c and 350d) of the rectification circuit 350 can be e.g., 400 VDC. When charging a second DC voltage (e.g., 24 VDC power source 305), the input DC voltage (from 350c and 350d) of the rectification circuit 350 can be e.g., 800 VDC. When charging a third DC voltage (e.g., 48 VDC power source 305), the input DC voltage (from 350c and 350d) of the rectification circuit 350 can be e.g., 1600 VDC or 1200 VDC.

It will be appreciated that in the charging mode/direction, for a particular voltage of the input DC voltage (from 350c and 350d) of the rectification circuit 350, the controller can control the switches 335, 340, 345 so that the output DC voltage from the self-configuring matrix power converter 400 can vary (e.g., 12 VDC, or 24 VDC, or 48 VDC).

Figure 5A:
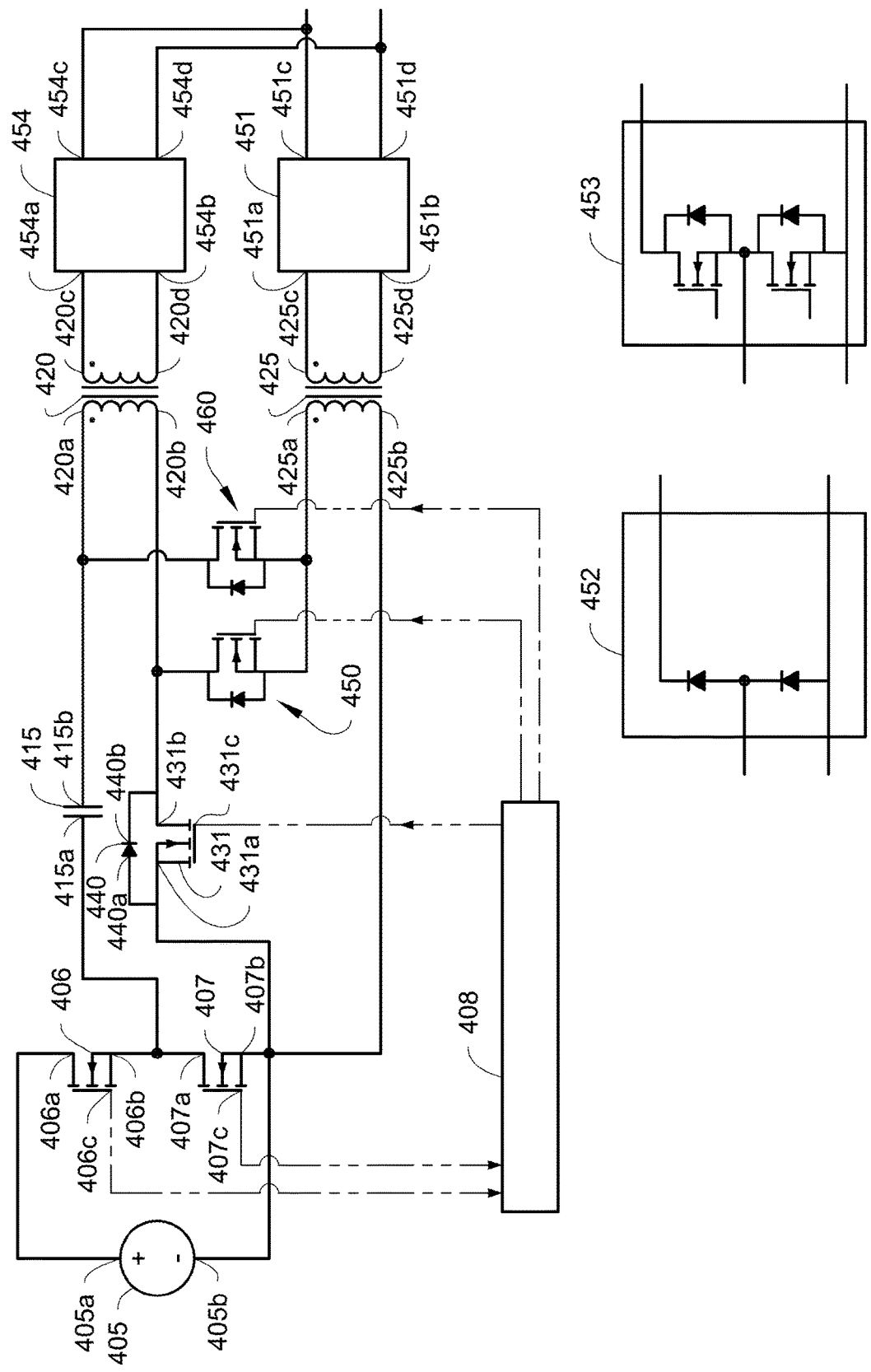
FIG. 5A is a circuit diagram of a self-configuring matrix power converter in a power circuit of a transport climate control system, according to another embodiment.

FIG. 5A is a circuit diagram of a self-configuring matrix power converter 500 in a power circuit of a transport climate control system, according to another embodiment.

The self-configuring matrix power converter 500 includes an inverter (406, 407). The inverter (406, 407) can be a DC to AC inverter (in a direction that drives e.g., the compressor) or an AC to DC inverter (e.g., in a direction that charges e.g., the DC power source or the DC energy storage). The inverter (406, 407) can be a half-bridge inverter for half-wave design. The inverter (406, 407) can connect to a DC power source 405. The DC power source 405 can be a Class A power source. For example, the DC power source 405 can be 12 VDC, 24 VDC, or other suitable DC voltage.

The self-configuring matrix power converter 500 also includes a switch 431 including a body diode 440 having an anode 440a and a cathode 440b; transformers 420, 425; a switch 450 including a body diode 459 having an anode 459a and a cathode 459b, a switch 460 including a body diode 469 having an anode 469a and a cathode 469b, and a rectification circuit 451 and a rectification circuit 454 for half-wave design. The DC power from the DC power source 405 can be input (e.g., in a direction that drives e.g., the compressor) to the inverter (406, 407) (e.g., a DC to AC inverter). The AC power from the inverter (406, 407) (e.g., an AC to DC inverter) can be input (e.g., in a direction that charges e.g., the DC power source 405) to the DC power source 405. The self-configuring matrix power converter 500 can also include a capacitor 415. The capacitor 415 can be a DC blocking capacitor. In one embodiment, the capacitor 415 can be optional. The controller can be configured to control the switches 406, 407, 450, 460, and 431. FIG. 5A shows the connections among the components. The ends 451c, 451d of the rectification circuit 451 and the ends 454c, 454d of the rectification circuit 454 can connect to e.g., a DC link (e.g., the DC link 220 of FIG. 3B) to e.g., drive a compressor via the CDM.

It will be appreciated that the transformers 420, 425 can share a same core, or having respective cores. Each transformer 420, 425 can convert AC from one voltage to another. It will be appreciated that in some embodiments, to simplify the description, 12 VAC (or other voltages) can be defined as an AC voltage converted from a 12 VDC via an inverter; and/or 12 VDC (or other voltages) can be defined as a DC voltage converted from a 12 VAC via a converter. Each transformer 420, 425 has a predetermined transformation ratio (magnetics). In some embodiments, each transformer 420, 425 has a same transformation ratio (in e.g., the compressor driving mode/direction).

The switches 406, 407, 450, 460, 431 can be a Metal—Oxide—Semiconductor Field-Effect Transistor (MOSFET), an Insulated Gate Bipolar Transistor (IGBT), or a Bipolar Junction Transistor (BJT), or the like. The rectification circuit 451 and/or the rectification circuit 454 can be a passive rectification circuit 452, or an active rectification circuit 453. It will also be appreciated that when the rectification circuits 451 and 454 are the active rectification circuit 453, the self-configuring matrix power converter 500 can operate bi-directional (a compressor driving direction using the DC power source 405 to drive the compressor, and/or a charging direction to charge the DC power source 405 with e.g., a utility power (shore) source).

In operation, in the compressor driving mode/direction, a controller 408 (e.g., the controller 125 of FIGS. 2, 3A, and 3B) can control the switches 406, 407, 450, 460, 431 based on the input voltage of the DC power source 405. It will be appreciated that the controller 408 can be configured to control the switch 406 (disposed at a high side of the half-bridge inverter) on and/or off (e.g., via pulse width modulation) to control energy flow through the coil of the transformer 420. The controller 408 can also be configured to control the switch 407 (disposed at a low side of the half-bridge inverter) on when e.g., the body diode of the MOSFET switch conducts flyback energy (e.g., from the coil) and the switch 407 can create lower energy dissipation than just using the body diode. The switch 407 can be used for synchronous rectification or active rectification.

When/if the voltage of the DC power source 405 is a first DC voltage (e.g., 12 VDC), the controller 408 can control the switch 431 on (connected/closed), and the switches 450 and 460 off (disconnected/opened). As such, only transformer 420 is used in the circuit. Transformer 425 is disconnected (not used). In such embodiment, a first DC voltage (e.g., 12 VDC) can be converted to a first AC voltage via the inverter (406, 407), and then to a second AC voltage (e.g., an HV AC) via the transformer 420, and then to an HV DC voltage (e.g., 400 VDC) output via the rectification circuit 454.

When/if the voltage of the DC power source 405 is a first DC voltage (e.g., 12 VDC), the controller 408 can also control the switch 460 on (connected/closed), and the switches 450 and 431 off (disconnected/opened). As such, only transformer 425 is used in the circuit. Transformer 420 is disconnected (not used). In such embodiment, a first DC voltage (e.g., 12 VDC) can be converted to a first AC voltage via the inverter (406, 407), and then to a second AC voltage (e.g., an HV AC) via the transformer 425, and then to an HV DC voltage (e.g., 400 VDC) output via the rectification circuit 451.

When/if the voltage of the DC power source 405 is a first DC voltage (e.g., 12 VDC), the controller 408 can further control the switches 431 and 460 on (connected/closed), and the switch 450 off (disconnected/opened). As such, both the transformers 420 and 425 are used in the circuit (in parallel). In such embodiment, a first DC voltage (e.g., 12 VDC) can be converted to a first AC voltage via the inverter (406, 407), and then to a second AC voltage (e.g., an HV AC) via the transformers 420 and 425, and then to an HV DC voltage (e.g., 400 VDC) output via the rectification circuits 451 and 454. The difference between this "transformers 420 and 425 used in parallel" configuration and the "only transformer 420 (or 425) is used" configuration is that in this "transformers 420 and 425 used in parallel" configuration, output current of the rectification circuits 451 and 454 is doubled (and thus power is doubled since the output voltage of the rectification circuits 451 and 454 keeps the same). It will be appreciated that in this parallel connection configuration, the output voltage of the rectification circuits 451 and 454 are also connected in parallel.

When/if the voltage of the DC power source 405 is a second voltage (e.g., 24 VDC), the controller 408 can control the switches 431 and 460 off (disconnected/opened), and the switch 450 on (connected/closed). As such, both the transformers 420 and 425 are used in the circuit in series. In such embodiment, a second DC voltage (e.g., 24 VDC) can be converted to a first AC voltage via the inverter (406, 407), and then to a second AC voltage (e.g., an HV AC) via the transformers 420 and 425, and then to an HV DC voltage (e.g., 800 VDC) via the rectification circuits 451 and 454. It will be appreciated that in this series connection configuration, the output voltage of the rectification circuits 451 and 454 are also connected in series.

In operation, in the charging mode/direction, the controller 408 can control the switches 406, 407, 450, 460, 431 based on the input voltage (from 451c/454c and 451d/454d) of the rectification circuits 451 and/or 454, to charge the DC power source 405. In such embodiment, the rectification circuits 451 and/or 454 are bi-directional. Similar to the operation in the compressor driving mode/direction (but in a reversed path), the controller 408 can control the switches 431, 450, 460 similarly such that when charging a first DC voltage (e.g., 12 VDC power source 405), the input DC voltage (from 451c/454c and 451d/454d) of the rectification circuits 451 and/or 454 can be e.g., 400 VDC. When charging a second DC voltage (e.g., 24 VDC power source 405), the input DC voltage (from 451c/454c and 451d/454d) of the rectification circuits 451 and/or 454 can be e.g., 800 VDC.

It will be appreciated that the switch 460 can be optional. In such embodiment, the self-configuring matrix power converter 500 does not include the switch 460. Such embodiment is equivalent to an embodiment where the switch 460 is always off (disconnected/opened). When the switch 460 is optional, the switch 450 can be optional too (equivalent to an embodiment where the switch 450 is always on (connected/closed)). In such embodiment, there are no "transformers 420 and 425 used in parallel" configuration and no "only transformer 425 is used" configuration.

Figure 5B:
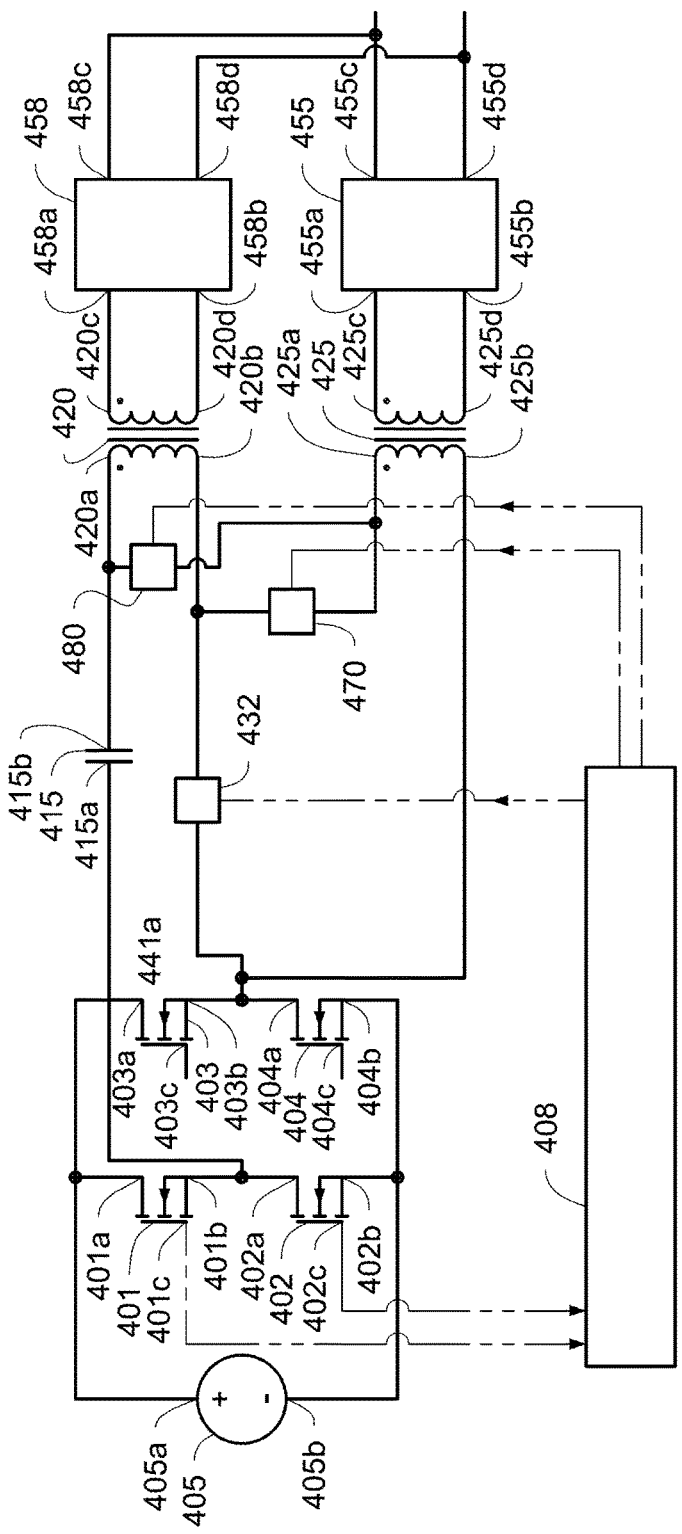
FIG. 5B is a circuit diagram of a self-configuring matrix power converter in a power circuit of a transport climate control system, according to yet another embodiment.
Figure 5B:
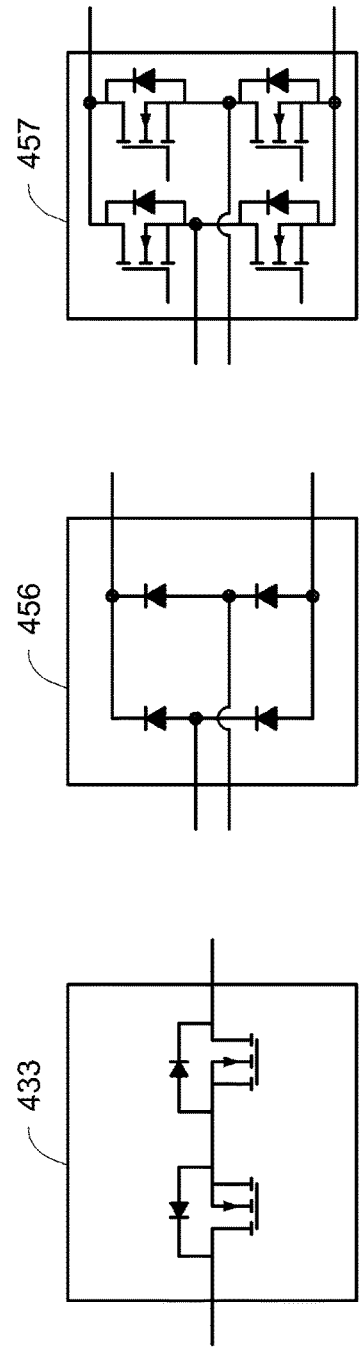

FIG. 5B is a circuit diagram of a self-configuring matrix power converter 501 in a power circuit of a transport climate control system, according to yet another embodiment.

The self-configuring matrix power converter 501 (and/or 500 of FIG. 5A) can be the self-configuring matrix power converter 230, 235 of FIGS. 3A and 3B. It will be appreciated that the self-configuring matrix power converter 501 (and/or 500 of FIG. 5A, and/or 400 of FIG. 4, and/or 230, 235 of FIGS. 3A and 3B) can include optional resonance(s) to make them a resonant switching converter.

The self-configuring matrix power converter 501 includes an inverter (401, 402, 403, 404). The inverter (401, 402, 403, 404) can be a DC to AC inverter (in a direction that drives e.g., the compressor), or an AC to DC inverter (e.g., in a direction that charges e.g., the DC power source or the DC energy storage). The inverter (401, 402, 403, 404) can be a full-bridge inverter for full-wave design. It will be appreciated that a full-bridge (two half-bridges) can create a full wave AC and not just a half wave AC created by a half-bridge. The inverter (401, 402, 403, 404) can connect to a DC power source 405. The DC power source 405 can be a Class A power source. For example, the DC power source 405 can be 12 VDC, 24 VDC, or other suitable DC voltage. It will be appreciated that in the embodiment of FIG. 5B, a negative power source is not considered, because if a negative polarity and positive polarity power source is provided then a half bridge (such as the embodiment of FIG. 5A) can be used to create a full wave AC, both positive half wave and negative half wave.

The self-configuring matrix power converter 501 also includes a switch set 432; transformers 420, 425; and a rectification circuit 455 and a rectification circuit 458 for full-wave design. It will be appreciated that the switch set 432 can be controlled on (connected/closed) or off (disconnected/opened) for the full wave (each of the two half waves). The self-configuring matrix power converter 501 further includes a switch set 470 and a switch set 480. Each of the switch sets 470 and 480 is similar to the switch set 432. Each of the switch set 432, 470, 480 can be e.g., represented by the switch set 433. The switch set 433 including two switches (one includes a body diode having an anode and a cathode for blocking current in one direction and the other includes a body diode having an anode and a cathode for blocking current in a reversed direction) for each of the two half waves. The DC power from the DC power source 405 can be input (e.g., in a direction that drives e.g., the compressor) to the inverter (401, 402, 403, 404) (e.g., a DC to AC inverter). The AC power from the inverter (401, 402, 403, 404) (e.g., an AC to DC inverter) can be input (e.g., in a direction that charges e.g., the DC power source 405) to the DC power source 405. The self-configuring matrix power converter 501 can also include a capacitor 415. The capacitor 415 can be a DC blocking capacitor. In one embodiment, the capacitor 415 can be optional. The controller can be configured to control the switches 401, 402, 403, 404, and switch sets (432, 433), 470, 480. FIG. 5B shows the connections among the components. The ends 455c, 455d of the rectification circuit 455 and the ends 458c, 458d of the rectification circuit 458 can connect to e.g., a DC link (e.g., the DC link 220 of FIG. 3B) to e.g., drive a compressor via the CDM.

It will be appreciated that the transformers 420, 425 can share a same core, or having respective cores. Each transformer 420, 425 can convert AC from one voltage to another. It will be appreciated that in some embodiments, to simplify the description, 12 VAC (or other voltages) can be defined as an AC voltage converted from a 12 VDC via an inverter;

and/or 12 VDC (or other voltages) can be defined as a DC voltage converted from a 12 VAC via a converter. Each transformer 420, 425 has a predetermined transformation ratio (magnetics). In some embodiments, each transformer 420, 425 has a same transformation ratio (e.g., that can convert 12 VAC to 400 VAC in e.g., the compressor driving mode/direction).

The switches 401, 402, 403, 404, and/or switches in the switch sets 432, 470, 480 can be a Metal—Oxide—Semiconductor Field-Effect Transistor (MOSFET), an Insulated Gate Bipolar Transistor (IGBT), or a Bipolar Junction Transistor (BJT), or the like. The rectification circuit 455 and/or the rectification circuit 458 can be a passive rectification circuit 456, or an active rectification circuit 457. It will also be appreciated that when the rectification circuits 455, 458 are the active rectification circuit 457, the self-configuring matrix power converter 501 can operate bi-directional (a compressor driving direction using the DC power source 405 to drive the compressor, and/or a charging direction to charge the DC power source 405 with e.g., a utility (shore) power source).

In operation, in the compressor driving mode/direction, a controller 408 (e.g., the controller 125 of FIGS. 2, 3A, and 3B) can control the switches 401, 402, 403, 404, and switch sets (432, 433), 470, 480 based on the input voltage of the DC power source 405. It will be appreciated that the controller 408 can be configured to control the switches 401 and 403 (disposed at a high side of the full-bridge inverter) on and/or off (e.g., via pulse width modulation) to control energy flow through (bi-directionally, forward and reverse) the coil of the transformer 420. The controller 408 can also be configured to control the switches 402 and 404 (disposed at a low side of the half-bridge inverter) on when e.g., the body diode of the MOSFET switches conduct flyback energy (e.g., from the coil) and the switches 402 and 404 can create lower energy dissipation than just using the body diode. The switches 402 and 404 can be used for synchronous rectification or active rectification.

When/if the voltage of the DC power source 405 is a first DC voltage (e.g., 12 VDC), the controller 408 can control the switch set 432 on (connected/closed), the switch sets 470 and 480 off (disconnected/opened). As such, only transformer 420 is used in the circuit. Transformer 425 is disconnected (not used). In such embodiment, a first DC voltage (e.g., 12 VDC) can be converted to a first AC voltage via the inverter (401, 402, 403, 404), and then to a second AC voltage (e.g., an HV AC) via the transformer 420, and then to an HV DC voltage output (e.g., 400 VDC) via the rectification circuit 458.

When/if the voltage of the DC power source 405 is a first DC voltage (e.g., 12 VDC), the controller 408 can also control the switch set 480 on (connected/closed), the switch sets 470 and 432 off (disconnected/opened). As such, only transformer 425 is used in the circuit. Transformer 420 is disconnected (not used). In such embodiment, a first DC voltage (e.g., 12 VDC) can be converted to a first AC voltage via the inverter (401, 402, 403, 404), and then to a second AC voltage (e.g., an HV AC) via the transformer 425, and then to an HV DC voltage (e.g., 400 VDC) via the rectification circuit 455.

When/if the voltage of the DC power source 405 is a first DC voltage (e.g., 12 VDC), the controller 408 can further control the switch sets 432 and 480 on (connected/closed), the switch set 470 off (disconnected/opened). As such, both transformers 420 and 425 are used in the circuit (in parallel). In such embodiment, a first DC voltage (e.g., 12 VDC) can be converted to a first AC voltage via the inverter (401, 402, 403, 404), and then to a second AC voltage (e.g., an HV AC) via the transformers 420 and 425, and then to an HV DC voltage (e.g., 400 VDC) via the rectification circuits 455 and 458. The difference between this "transformers 420 and 425 used in parallel" configuration and the "only transformer 420 (or 425) is used" configuration is that in this "transformers 420 and 425 used in parallel" configuration, output current of the rectification circuits 451 and 454 is doubled (and thus power is doubled since the output voltage of the rectification circuits 451 and 454 keeps the same). It will be appreciated that in this parallel connection configuration, the output voltage of the rectification circuits 455 and 458 are also connected in parallel.

When/if the voltage of the DC power source 405 is a second voltage (e.g., 24 VDC), the controller 408 can control the switch sets 432 and 480 off (disconnected/opened) and the switch set 470 on (connected/closed). As such, both transformers 420 and 425 are used in the circuit in series. In such embodiment, a second DC voltage (e.g., 24 VDC) can be converted to a first AC voltage via the inverter (401, 402, 403, 404), and then to a second AC voltage (e.g., an HV AC) via the transformers 420 and 425, and then to an HV DC voltage (e.g., 800 VDC) via the rectification circuits 455 and 458. It will be appreciated that in this series connection configuration, the output voltage of the rectification circuits 455 and 458 are also connected in series.

In operation, in the charging mode/direction, the controller 408 can control the switches 401, 402, 403, 404, and switch sets (432, 433), 470, 480 based on the input voltage (from 455c/458c and 455d/458d) of the rectification circuits 455 and/or 458, to charge the DC power source 405. In such embodiment, the rectification circuits 455 and 458 are bi-directional. Similar to the operation in the compressor driving mode/direction (but in a reversed path), the controller 408 can control the switch sets 432, 470, 480 similarly such that when charging a first DC voltage (e.g., 12 VDC power source 405), the input DC voltage (from 455c/458c and 455d/458d) of the rectification circuits 455 and/or 458 can be e.g., 400 VDC. When charging a second DC voltage (e.g., 24 VDC power source 405), the input DC voltage (from 455c/458c and 455d/458d) of the rectification circuits 455 and/or 458 can be e.g., 800 VDC.

It will be appreciated that the switch set 480 can be optional. In such embodiment, the self-configuring matrix power converter 501 does not include the switch set 480. Such embodiment is equivalent to an embodiment where the switch 480 is always off (disconnected/opened). When the switch 480 is optional, the switch 470 can be optional too (equivalent to an embodiment where the switch 470 is always on (connected/closed)). In such embodiment, there are no "transformers 420 and 425 used in parallel" configuration and no "only transformer 425 is used" configuration.

Figure 5C:
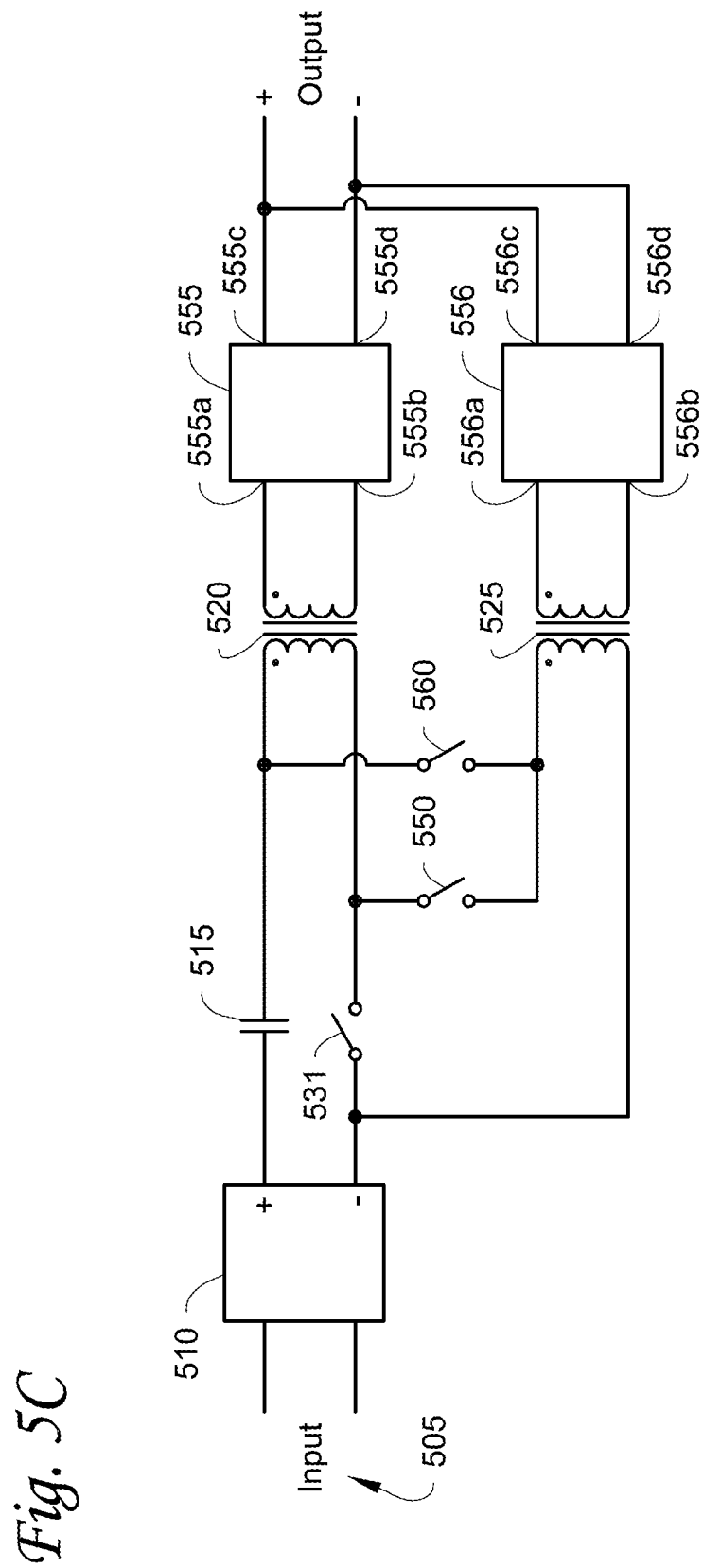
FIG. 5C is a circuit diagram of a self-configuring matrix power converter in a power circuit of a transport climate control system, according to one embodiment.

FIG. 5C is a circuit diagram of a self-configuring matrix power converter 502 in a power circuit of a transport climate control system, according to one embodiment. FIG. 5C is a simplified version of the embodiment of FIG. 5A and/or FIG. 5B.

The self-configuring matrix power converter 502 includes a bridge 510 that can connect to a DC power source 505 (similar to the power source 405 of FIGS. 5A and/or 5B). The bridge 510 can be a half-bridge inverter for half-wave design (similar to 406 and 407 of FIG. 5A) or a full-bridge inverter for full-wave design (similar to 401-404 of FIG. 5B).

The self-configuring matrix power converter 502 includes switches (or switch sets for full-wave design) 531, 550, 560. The switches 531, 550, 560 are similar to the switches 431,

450, 460 of FIG. 5A or the switch sets 432, 470, 480 of FIG. 5B. The self-configuring matrix power converter 502 also includes transformers 520, 525 (similar to transformers 420, 425 of FIGS. 5A and/or 5B), a rectification circuit 555 and a rectification circuit 556 (similar to the rectification circuits 451, 454 of FIG. 5A and/or the rectification circuits 455, 458 of FIG. 5B). The self-configuring matrix power converter 500 can also include a capacitor 515 (similar to the capacitor 415 of FIGS. 5A and/or 5B). The controller (not shown) can be configured to control the switches 531, 550, 560. The ends 555c, 555d of the rectification circuit 555 and the ends 556c, 556d of the rectification circuit 556 can connect to e.g., a DC link (e.g., the DC link 220 of FIG. 3B) to e.g., drive a compressor via the CDM.

Similar to the embodiments of FIGS. 5A and/or 5B, the controller can control the switch 531 on (connected/closed), and the switches 550 and 560 off (disconnected/opened). As such, only transformer 520 is used in the circuit. The controller can also control the switch 560 on (connected/closed), and the switches 531 and 550 off (disconnected/opened). As such, only transformer 525 is used in the circuit. The controller can further control the switches 531 and 560 on (connected/closed), and the switch 550 off (disconnected/opened). As such, both transformers 520 and 525 are used in the circuit in parallel. Also the controller can control the switch 550 on (connected/closed), and the switches 531 and 560 off (disconnected/opened). As such, both transformers 520 and 525 are used in the circuit in series.

Similar to the embodiments of FIG. 5A and/or 5B, the self-configuring matrix power converter 502 can be bi-directional (one direction is the path of driving the load (e.g., driving a compressor via the CDM) connected to the rectification circuits 555 and/or 556, via the input voltage/current from the DC power source 505; and the other direction is the path of charging the DC power source 505 with input voltage/current received from the rectification circuits 555 and/or 556).

Similar to the embodiments of FIGS. 5A and/or 5B, the self-configuring matrix power converter 502 can be a half-wave design or a full-wave design. The switch (or switch set) 560 can be optional. Such embodiment is equivalent to an embodiment where the switch 560 is always off (disconnected/opened). When the switch 560 is optional, the switch 550 can be optional too (equivalent to an embodiment where the switch 550 is always on (connected/closed)). In such embodiment, the controller can be configured to control the switches 531 and/or 550 for an "only transformer 520 is used" configuration (531 on, 550 off) or a "transformers 520 and 525 used in series" configuration (531 off, 550 on).

It will be appreciated that in FIGS. 5A-5C, the rectifier pairs 454 and 451, 458 and 455, and 555 and 556 can be combined into one rectifier (see 350 in FIG. 4) or separated as they are as shown in FIGS. 5A-5C.

Aspects

It is to be appreciated that any of aspects 1-3 can be combined with any of aspects 4 and/or 5-16. Aspect 4 can be combined with any of aspects 5-16. Any of aspects 17-19 can be combined with any of aspects 20 and/or 21-32. Aspect 20 can be combined with any of aspects 21-32.

Aspect 1. A transport climate control system, comprising:
a self-configuring matrix power converter having a charging mode;
an inverter circuit;
a controller;
a first DC energy storage and a second DC energy storage; and
a compressor,
wherein the first DC energy storage and the second DC energy storage have different voltage levels;
wherein during the charging mode, the inverter circuit is configured to convert a first AC voltage from an energy source to a first DC voltage, the controller is configured to control the self-configuring matrix power converter to convert the first DC voltage to a first output DC voltage to charge the first DC energy storage, and/or to a second output DC voltage to charge the second DC energy storage.

Aspect 2. The transport climate control system according to aspect 1, wherein the self-configuring matrix power converter has an operation mode,
wherein during the operation mode, the controller is configured to control the self-configuring matrix power converter to convert a first input DC voltage from the first DC energy storage to a second DC voltage, and/or to convert a second input DC voltage from the second DC energy storage to the second DC voltage, the inverter circuit is configured to convert the second DC voltage to a second AC voltage to drive the compressor.

Aspect 3. The transport climate control system according to aspect 1 or aspect 2, wherein the self-configuring matrix power converter is bidirectional.

Aspect 4. A transport climate control system, comprising:
a self-configuring matrix power converter having an operation mode;
an inverter circuit;
a controller;
a first DC energy storage and a second DC energy storage; and
a compressor,
wherein the first DC energy storage and the second DC energy storage have different voltage levels;
wherein during the operation mode, the controller is configured to control the self-configuring matrix power converter to convert a first input DC voltage from the first DC energy storage to a second DC voltage, and/or to convert a second input DC voltage from the second DC energy storage to the second DC voltage, the inverter circuit is configured to convert the second DC voltage to an AC voltage to drive the compressor.

Aspect 5. A self-configuring matrix power converter for a transport climate control system, comprising:
a first converter circuit;
a transformer circuit connecting to the first converter circuit;
a second converter circuit connecting to the transformer circuit; and
at least one switch having a first state and a second state;
wherein the self-configuring matrix power converter has an operation mode,
wherein during the operation mode, the least one switch is controlled to be in the first state to convert a first input DC voltage to a second DC voltage, and to be in the second state to convert a second input DC voltage to the second DC voltage.

Aspect 6. The self-configuring matrix power converter according to aspect 5, wherein the self-configuring matrix power converter has a charging mode,
wherein during the charging mode, the least one switch is controlled to be in the first state to convert a first DC voltage to a first output DC voltage, and to be in the second state to convert the first DC voltage to a second output DC voltage,
wherein the first output DC voltage is different from the second output DC voltage.

Aspect 7. The self-configuring matrix power converter according to aspect 5 or aspect 6, wherein the first converter circuit is a half-bridge inverter.

Aspect 8. The self-configuring matrix power converter according to aspect 5 or aspect 6, wherein the first converter circuit is a full-bridge inverter.

Aspect 9. The self-configuring matrix power converter according to aspect 5 or aspect 6, wherein the first converter circuit is bidirectional.

Aspect 10. The self-configuring matrix power converter according to any one of aspects 5-9, wherein the transformer circuit has at least two windings, the at least two windings share a same core.

Aspect 11. The self-configuring matrix power converter according to any one of aspects 5-9, wherein the transformer circuit has at least two windings, each of the at least two windings has a core.

Aspect 12. The self-configuring matrix power converter according to any one of aspects 5-11, wherein the second converter circuit is a passive rectifier.

Aspect 13. The self-configuring matrix power converter according to any one of aspects 5-11, wherein the second converter circuit is an active rectifier.

Aspect 14. The self-configuring matrix power converter according to any one of aspects 5-11, wherein the second converter circuit is bidirectional.

Aspect 15. The self-configuring matrix power converter according to any one of aspects 5-14, wherein the at least one switch is a MOSFET switch.

Aspect 16. The self-configuring matrix power converter according to any one of aspects 5-15, further comprising a capacitor, wherein the capacitor is a DC blocking capacitor disposed between the first converter circuit and the transformer circuit.

Aspect 17. An electrically powered accessory, comprising:
a self-configuring matrix power converter having a charging mode;
an inverter circuit;
a controller;
a first DC energy storage and a second DC energy storage; and
a compressor,
wherein the first DC energy storage and the second DC energy storage have different voltage levels;
wherein during the charging mode, the inverter circuit is configured to convert a first AC voltage from an energy source to a first DC voltage, the controller is configured to control the self-configuring matrix power converter to convert the first DC voltage to a first output DC voltage to charge the first DC energy storage, and/or to a second output DC voltage to charge the second DC energy storage.

Aspect 18. The electrically powered accessory according to aspect 17, wherein the self-configuring matrix power converter has an operation mode,
wherein during the operation mode, the controller is configured to control the self-configuring matrix power converter to convert a first input DC voltage from the first DC energy storage to a second DC voltage, and/or to convert a second input DC voltage from the second DC energy storage to the second DC voltage, the inverter circuit is configured to convert the second DC voltage to a second AC voltage to drive the compressor.

Aspect 19. The electrically powered accessory according to aspect 17 or aspect 18, wherein the self-configuring matrix power converter is bidirectional.

Aspect 20. An electrically powered accessory, comprising:
a self-configuring matrix power converter having an operation mode;
an inverter circuit;
a controller;
a first DC energy storage and a second DC energy storage; and
a compressor,
wherein the first DC energy storage and the second DC energy storage have different voltage levels;
wherein during the operation mode, the controller is configured to control the self-configuring matrix power converter to convert a first input DC voltage from the first DC energy storage to a second DC voltage, and/or to convert a second input DC voltage from the second DC energy storage to the second DC voltage, the inverter circuit is configured to convert the second DC voltage to an AC voltage to drive the compressor.

Aspect 21. A self-configuring matrix power converter for an electrically powered accessory, comprising:
a first converter circuit;
a transformer circuit connecting to the first converter circuit;
a second converter circuit connecting to the transformer circuit; and
at least one switch having a first state and a second state;
wherein the self-configuring matrix power converter has an operation mode,
wherein during the operation mode, the least one switch is controlled to be in the first state to convert a first input DC voltage to a second DC voltage, and to be in the second state to convert a second input DC voltage to the second DC voltage.

Aspect 22. The self-configuring matrix power converter according to aspect 21, wherein the self-configuring matrix power converter has a charging mode,
wherein during the charging mode, the least one switch is controlled to be in the first state to convert a first DC voltage to a first output DC voltage, and to be in the second state to convert the first DC voltage to a second output DC voltage,
wherein the first output DC voltage is different from the second output DC voltage.

Aspect 23. The self-configuring matrix power converter according to aspect 21 or aspect 22, wherein the first converter circuit is a half-bridge inverter.

Aspect 24. The self-configuring matrix power converter according to aspect 21 or aspect 22, wherein the first converter circuit is a full-bridge inverter.

Aspect 25. The self-configuring matrix power converter according to aspect 21 or aspect 22, wherein the first converter circuit is bidirectional.

Aspect 26. The self-configuring matrix power converter according to any one of aspects 21-25, wherein the transformer circuit has at least two windings, the at least two windings share a same core.

Aspect 27. The self-configuring matrix power converter according to any one of aspects 21-25, wherein the transformer circuit has at least two windings, each of the at least two windings has a core.

Aspect 28. The self-configuring matrix power converter according to any one of aspects 21-27, wherein the second converter circuit is a passive rectifier.

Aspect 29. The self-configuring matrix power converter according to any one of aspects 21-27, wherein the second converter circuit is an active rectifier.

Aspect 30. The self-configuring matrix power converter according to any one of aspects 21-27, wherein the second converter circuit is bidirectional.

Aspect 31. The self-configuring matrix power converter according to any one of aspects 21-30, wherein the at least one switch is a MOSFET switch.

Aspect 32. The self-configuring matrix power converter according to any one of aspects 21-31, further comprising a capacitor, wherein the capacitor is a DC blocking capacitor disposed between the first converter circuit and the transformer circuit.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. A power converter for a transport climate control system, the transport climate control system including a compressor and providing climate control within a climate controlled space, the power converter comprising:
   a first converter circuit;
   a transformer circuit connecting to the first converter circuit;
   a second converter circuit connecting to the transformer circuit; and
   at least one switch having a first state and a second state;
   wherein the power converter has an operation mode,
   wherein during the operation mode, the at least one switch is controlled to be in the first state to convert a first input DC voltage to a first DC voltage, and to be in the second state to convert a second input DC voltage to a second DC voltage,
   wherein the first input DC voltage is different from the second input DC voltage,
   wherein the power converter has a charging mode,
   wherein during the charging mode, the at least one switch is controlled to be in the first state to convert a first charging DC voltage to a first output DC voltage, and to be in the second state to convert a second charging DC voltage to a second output DC voltage,
   wherein the first output DC voltage is different from the second output DC voltage.

2. The power converter according to claim 1, wherein the first converter circuit is a half-bridge inverter.

3. The power converter according to claim 1, wherein the first converter circuit is a full-bridge inverter.

4. The power converter according to claim 1, wherein the first converter circuit is bidirectional.

5. The power converter according to claim 1, wherein the transformer circuit has at least two windings, the at least two windings share a same core.

6. The power converter according to claim 1, wherein the transformer circuit has at least two windings, each of the at least two windings has a core.

7. The power converter according to claim 1, wherein the second converter circuit is a passive rectifier.

8. The power converter according to claim 1, wherein the second converter circuit is an active rectifier.

9. The power converter according to claim 1, wherein the second converter circuit is bidirectional.

10. The power converter according to claim 1, wherein the at least one switch is a MOSFET switch.

11. The power converter according to claim 1, further comprising a capacitor, wherein the capacitor is a DC blocking capacitor disposed between the first converter circuit and the transformer circuit.

12. The power converter according to claim 1, wherein the first DC voltage is the same as the second DC voltage.

13. The power converter according to claim 1, wherein during the operation mode, when the at least one switch is in the first state, the first converter circuit is configured to convert the first input DC voltage to a first AC low voltage, the transformer circuit is configured to convert the first AC low voltage to a first AC high voltage, the second converter circuit is configured to convert the first AC high voltage to the first DC voltage; and when the at least one switch is in the second state, the first converter circuit is configured to convert the second input DC voltage to a second AC low voltage, the transformer circuit is configured to convert the second AC low voltage to a second AC high voltage, the second converter circuit is configured to convert the second AC high voltage to the second DC voltage.

14. The power converter according to claim 13, wherein inputs of the transformer circuit connect to outputs of the first converter circuit, outputs of the transformer circuit connect to inputs of the second converter circuit.

15. The power converter according to claim 14, wherein the transformer circuit has first windings and second windings, the at least one switch is controlled such that at least one of the first windings and the second windings are used in the transformer circuit.

16. A power converter for a transport climate control system, comprising:
   a first converter circuit; a transformer circuit having a first primary winding and a second primary winding; a second converter circuit; and a plurality of switches having a first state, a second state, a third state, and a fourth state,
   wherein the transformer circuit connects to the first converter circuit, the second converter circuit connects to the transformer circuit, and the power converter has an operation mode, wherein during the operation mode, the plurality of switches is controlled to be
   in the first state to convert a first input DC voltage to a first DC voltage and to enable the first primary winding;
   in the second state to convert the first input DC voltage to the first DC voltage and to enable the second primary winding;

in the third state to convert the first input DC voltage to the first DC voltage and to enable both the first primary winding and the second primary winding; and in the fourth state to convert a second input DC voltage to a second DC voltage and to enable both the first primary winding and the second primary winding, wherein the first input DC voltage is different from the second input DC voltage.

17. The power converter of claim 16, wherein in the third state, the first primary winding and the second primary winding work in parallel for the power converter to provide the first DC voltage.

18. The power converter of claim 16, wherein output current of the power converter in the third state is greater than output current of the power converter in the first state or in the second state.

19. The power converter of claim 16, wherein the second primary winding is disabled in the first state, and the first primary winding is disabled in the second state.

20. The power converter of claim 16, wherein the power converter has a charging mode, wherein during the charging mode, the plurality of switches is controlled to be in a first charging state to convert a first charging DC voltage to a first output DC voltage, and to be in a second charging state to convert a second charging DC voltage to a second output DC voltage, wherein the first output DC voltage is different from the second output DC voltage.

* * * * *